US010080348B2

(12) United States Patent
Sharpe et al.

(10) Patent No.: US 10,080,348 B2
(45) Date of Patent: Sep. 25, 2018

(54) SENSOR APPARATUS AND ASSOCIATED SYSTEMS AND METHODS

(71) Applicant: ACCELERENZ LIMITED, Hamilton (NZ)

(72) Inventors: Johnathan Charles Sharpe, Hamilton (NZ); Philip Rowe, Hamilton (NZ); Ramakrishnan Vishwanath, Hamilton (NZ); Paul Julian Martinsen, Hamilton (NZ)

(73) Assignee: ST Reproductive Technologies, LLC, Navasota, TX (US)

( * ) Notice: Subject to any disclaimer, the term of this patent is extended or adjusted under 35 U.S.C. 154(b) by 266 days.

(21) Appl. No.: 14/282,841

(22) Filed: May 20, 2014

(65) Prior Publication Data
US 2014/0338447 A1 Nov. 20, 2014

(30) Foreign Application Priority Data

May 20, 2013 (NZ) ........................... 610787
Jun. 7, 2013 (NZ) ........................... 611703

(51) Int. Cl.
*A01K 11/00* (2006.01)
*A01K 29/00* (2006.01)
*A61D 17/00* (2006.01)
(52) U.S. Cl.
CPC ............ *A01K 29/005* (2013.01); *A01K 11/00* (2013.01); *A61D 17/002* (2013.01)
(58) Field of Classification Search
CPC .............................. A01K 29/005; A01K 11/00
USPC .......................................................... 73/431
See application file for complete search history.

(56) References Cited

U.S. PATENT DOCUMENTS

| 4,239,018 A | 12/1980 | Griffin et al. |
| 4,503,808 A | 3/1985 | McAlister |
| 5,111,799 A * | 5/1992 | Senger ................ A61D 17/002 600/551 |

(Continued)

FOREIGN PATENT DOCUMENTS

| NZ | 627951 | 2/2016 |
| WO | 0036907 A1 | 6/2000 |

(Continued)

OTHER PUBLICATIONS

Xu, Z. Z. et al., Estrus detection using radiotelemetry of visual observation and tail painting for dairy cows on pasture, Journal of Dairy Science, 81, pp. 2890-2896 (1998).

(Continued)

*Primary Examiner* — Harshad R Patel
*Assistant Examiner* — Jamel Williams
(74) *Attorney, Agent, or Firm* — Ryan Christensen; Hashim Rahman

(57) ABSTRACT

Exemplary embodiments are directed to sensor apparatuses for attachment to an animal that include a housing and a sensor assembly. The housing can be attachable to the animal and includes an internal cavity formed therein. The sensor assembly can be disposed within the internal cavity of the housing. The sensor assembly includes a force sensor and an accelerometer arranged to detect force data and accelerometer data representative of a physiological state of the animal. Exemplary embodiments are also directed to method and sensor systems for detecting a physiological state of an animal.

18 Claims, 16 Drawing Sheets

(56) References Cited

U.S. PATENT DOCUMENTS

| | | | | |
|---|---|---|---|---|
| 5,511,560 | A * | 4/1996 | Begouen | A61D 17/008 600/551 |
| 5,542,431 | A | 8/1996 | Starzl et al. | |
| 5,554,973 | A | 9/1996 | Kawashima | |
| 6,236,318 | B1 | 5/2001 | Yang et al. | |
| 6,860,859 | B2 | 3/2005 | Mehrotra et al. | |
| 7,083,575 | B1 | 8/2006 | Claycomb et al. | |
| 7,335,168 | B2 * | 2/2008 | Rugg | A61B 5/1113 119/712 |
| 7,878,149 | B2 * | 2/2011 | Voronin | A61D 17/002 119/174 |
| 8,137,259 | B1 * | 3/2012 | Dennis | A61N 1/40 600/13 |
| 9,119,379 | B1 | 9/2015 | Yancey et al. | |
| 9,138,172 | B2 | 9/2015 | Borkholder | |
| 9,538,729 | B2 * | 1/2017 | Yarden | A01K 29/005 |
| 2004/0177531 | A1 | 9/2004 | DiBendetto et al. | |
| 2005/0012623 | A1 * | 1/2005 | Jackson, III | A61D 17/002 340/573.3 |
| 2008/0066693 | A1 | 3/2008 | Bocquier | |
| 2010/0063778 | A1 * | 3/2010 | Schrock | A43B 3/00 702/188 |
| 2010/0218733 | A1 * | 9/2010 | Jordan | A01K 15/02 119/720 |
| 2010/0302004 | A1 * | 12/2010 | Winstead | A01K 29/005 340/7.32 |
| 2011/0137200 | A1 * | 6/2011 | Yin | A61B 5/04085 600/547 |
| 2013/0192526 | A1 * | 8/2013 | Mainini | A01K 15/021 119/51.02 |
| 2013/0245391 | A1 * | 9/2013 | Hyde | A61B 5/02208 600/301 |
| 2014/0182519 | A1 * | 7/2014 | Tupin, Jr. | A01K 27/009 119/859 |
| 2014/0251234 | A1 * | 9/2014 | Deutsch | A01K 15/021 119/721 |
| 2017/0083018 | A1 * | 3/2017 | Womble | A01K 27/009 |

FOREIGN PATENT DOCUMENTS

| | | |
|---|---|---|
| WO | WO0033031 | 6/2000 |
| WO | 2015160263 A1 | 10/2015 |

OTHER PUBLICATIONS

Nebel, R. L. et al., Automated electronic systems for the detection of oestrus and timing of AI in cattle, Animal Reproduction Science, 60-61, pp. 713-723 (2000).

International Search Report and Written Opinion for PCT/IB14/01607 dated Dec. 24, 2014.

European extended Search Report dated Jan. 10, 2017 issued in related EP Application No. 14801028.3.

Australian Examination Report dated Mar. 6, 2018 issued in related AU Application No. 2014270036.

US Office Action dated Apr. 6, 2018 issued in related U.S. Appl. No. 15/670,950.

* cited by examiner

SENSOR APPARATUS AND ASSOCIATED SYSTEMS AND METHODS

CROSS-REFERENCE TO RELATED APPLICATIONS

The present application claims under 35 U.S.C. § 119 the benefit of priority of New Zealand provisional patent application entitled "Sensor Assembly Mounting and Housing Apparatus" which was filed on May 20, 2013 and assigned Application Serial No. 610787, and the benefit of priority of New Zealand provisional patent application entitled "Sensor Apparatus" which was filed on Jun. 7, 2013 and assigned Application Serial No. 611703. The entire content of each of the foregoing New Zealand provisional patent applications is incorporated herein by reference in their entirety.

TECHNICAL FIELD

The present disclosure relates to sensor apparatuses and, in particular, to sensor apparatuses and associated system and methods including a sensor assembly with a sensor to sense force or pressure and an accelerometer arranged to detect a physiological state of an animal.

BACKGROUND

Sensor assemblies can be used in a range of applications to provide valuable and time critical data or information. For example, in the case of livestock breeding applications, there are significant constraints on effective herd management strategies which relate to monitoring the state of an animal, taking an action based on knowing one or more states of that animal, or the state(s) of that animal relative to other animals.

*Oestrus* activity is manifested as a behavioral demonstration of the animal's physiological state. Changing and evolving systems in breeding, farming intensity, animal housing, grazing and other animal management practices has led to a lower expression of *oestrus* activity.

SUMMARY

In accordance with embodiments of the present disclosure, exemplary sensor apparatuses or assemblies and associated systems and methods are provided that include an improved sensor assembly that allows for accurate detection of one or more physiological states of an animal. The sensor assemblies disclosed herein allow for accurate placement of the sensor assembly on an animal, e.g., a livestock animal, which securely mounts the sensor assembly on the animal, and which protects the sensor assembly from damage. In particular, the exemplary sensor apparatuses can be used to assist in the correct placement and effective mounting of a sensor assembly to an animal, and can be used to protect the components of the sensor assembly from adverse environmental conditions.

The sensor assembly of the exemplary sensor apparatuses include a combination of a force sensor and an accelerometer to provide for accurate detection of data representative of a physiological state of the animal. The exemplary sensor apparatuses improve animal husbandry practices to provide more accurate monitoring of an animal state or reproductive state or both, tiling and to enable better informed, managed and timed actions related to reproductive and other herd management decisions.

In accordance with embodiments of the present disclosure, exemplary sensor apparatuses for attachment to an animal are provided that include a housing and a sensor assembly. The housing can be attachable to the animal and includes an internal cavity formed therein. The sensor assembly can be disposed within the internal cavity. The sensor assembly includes a force sensor and an accelerometer arranged to detect force data and acceleration data representative of a physiological state of the animal, e.g., a breeding status, a reproductive state, health, nutrition, and the like. The force sensor can detect a magnitude of a force applied to the animal and a length of time the force is applied to the animal. The accelerometer can detect vibration or a velocity of the animal over a length of time. Measurement data relating to these forces and the motion of the animal can provide significant insight into the physiological state of an animal.

It should be understood that in some embodiments, the force sensor, the accelerometer, or both, can measure multiple magnitudes of force and motion, respectively. For example, rather than measuring the instance of force being applied for a particular amount of time, the force sensor can detect different magnitudes of force being applied at each point in time and the length of time the force is being applied to the animal. Similarly, rather than measuring the instance of motion of the animal, the accelerometer can detect different magnitudes of vibration or acceleration at each point in time over the length of time the motion takes place. In some embodiments, the sensor apparatuses include a processing device programmable to analyze the force data and the accelerometer data to verity the psychological state of the animal. Significant advantages can also accrue if this measurement data is made available in a timely manner. In particular, the measured data can alert a user of a breeding status or reproductive state of the animal, thereby allowing the user to timely act to inseminate or cure the animal, or both. In some embodiments, the collected data can be processed at, e.g., a farmer's location, at a breeder's location, at a mobile location, at a central processing location, combinations thereof, and the like.

The sensor assembly can include a power source, e.g., a rechargeable power source. The power source can be, e.g., a photovoltaic element, a chemical battery, a super capacitor, a fuel cell, a mechanical energy harvest system, combinations thereof, and the like. The housing includes a first flexible sheet and a second flexible sheet. The first and second flexible sheets can be secured relative to each other to form the internal cavity. In some embodiments, at least one of the first and second flexible sheets can include transmissive properties. For example, in some embodiments, at least one of the first and second flexible sheets can be transparent (e.g., see-through), acoustically transparent or propagating, transmits light, transmits electromagnetic radiation, is not completely opaque to light or electromagnetic radiation, combinations thereof, and the like. At least one of the first and second flexible sheets can conform to a profile of a mounting location of the animal.

In some embodiments, the housing includes a resiliently deformable material defining a mounting surface profile complementary to a mounting location of the animal. At least one of the first and second flexible sheets can be secured to the resiliently deformable material. The mounting location profile of the resiliently deformable material can assist in accurately positioning the housing onto the animal by matching the mounting location profile to the corresponding profile of the mounting location of the animal.

In some embodiments, the sensor apparatuses include a retention mechanism for retaining the first and second flexible sheets secured relative to each other. The retention mechanism can be operable between an engaged position and a disengaged position. In the engaged position, the retention mechanism can maintain the sensor assembly within the internal cavity in a sealed environment. In the disengaged position, the retention mechanism can create an opening between the first and second flexible sheets for access to the internal cavity. In some embodiments, the retention mechanism can be in the form of one or more clasps. In some embodiments, the retention mechanism can be in the form of a flexible sheet with an adhesive on at least one side. For example, the interior cavity of the housing can be exposed to receive the sensor assembly therein and the flexible sheet can be positioned over the interior cavity and secured to the housing such that the sensor assembly is encased within the interior cavity in a fluid-resistant manner.

In some embodiments, the sensor assembly includes, e.g., a visual indicator, an audio indicator, a radio transmission, combinations thereof, and the like, for generating a signal regarding the detected force data and accelerometer data representative of the physiological state of the animal. In some embodiments, the visual signals, audio signals, radio signals, combinations thereof, and the like, can be perceived by a human, a machine, or both. For example, in some embodiments, sensors, cameras, or both, can detect at least one of visual signals, audio signals, and radio signals generated by the sensor assembly. In some embodiments, the sensor assembly includes a transmitter, e.g., a relay, an intermediary device, and the like, for transmitting force data and accelerometer data to an electronic device configured to store the force and accelerometer data.

In accordance with embodiments of the present disclosure, exemplary methods for detecting a physiological state of an animal are provided. The methods include providing a sensor apparatus mountable to the animal. The sensor apparatus includes a housing and a sensor assembly. The housing is attachable to the animal and includes an internal cavity formed therein. The sensor assembly can be disposed within the internal cavity. The sensor assembly includes a force sensor and an accelerometer arranged to detect force data and accelerometer data representative of the physiological state of the animal. The methods include receiving force data and accelerometer data from the sensor assembly. The methods include analyzing the received force data and accelerometer data, e.g., with a processing device, to verify the physiological state of the animal.

In some embodiments, the methods include conforming at least one of a first and second flexible sheet of the housing to a profile of a mounting location of the animal. In some embodiments, the methods include accurately positioning the housing onto a mounting location of the animal by aligning a mounting surface profile of a resiliently deformable material of the housing with a complementary profile of the animal. In some embodiments, the methods include generating a perceptible signal with at least one of a visual indicator, an audio indicator, and a radio indicator regarding the detected force data and accelerometer data representative of the physiological state of the animal.

In accordance with embodiments of the present disclosure, exemplary sensor systems for detecting a physiological state of an animal are provided that include a computer storage device, a sensor apparatus and a processing device. The computer storage device can store information representative of the physiological state of the animal. The sensor apparatus can include a housing and a sensor assembly. The housing can be attachable to the animal and includes an internal cavity formed therein. The sensor assembly can be disposed within the internal cavity. The sensor assembly includes a force sensor and an accelerometer arranged to detect force data and accelerometer data representative of a physiological state of the animal. The processing device can be programmable to analyze the detected force data and accelerometer data to verify the physiological state of the animal. In some embodiments, the processing device can be programmable to transmit the detected force data and accelerometer data from the sensor apparatus to the computer storage device. In some embodiments, the processing device can be programmable to transmit the verified physiological state of the animal from the sensor apparatus to the computer storage device.

In some embodiments, the sensor apparatus can, e.g., be the source of data collected from the sensors, collect data from other devices or sensor apparatuses, receive instructions or updates from a central processing device, combinations thereof, and the like. In some embodiments, a transmitter, e.g., an intermediary device, a relay, a repeater, and the like, can, e.g., receive data from one or more sensor apparatuses, receive data from a central processing device, send data to one or more sensor apparatuses, send data to a central processing device, combinations thereof, and the like. In some embodiments, a repository, e.g., a central processing device, a computer storage device, or both, can, e.g., store data received from the sensor apparatuses, the transmitters, or both, send data to the sensor apparatuses, the transmitters, or both, combinations thereof, and the like.

Other objects and features will become apparent from the following detailed description considered in conjunction with the accompanying drawings. It is to be understood, however, that the drawings are designed as an illustration and not as a definition of the limits of the invention.

BRIEF DESCRIPTION OF THE DRAWINGS

To assist those of skill in the art in making and using the disclosed sensor apparatuses and associated systems and methods, reference is made to the accompanying figures, wherein.

DESCRIPTION

Figure 2:
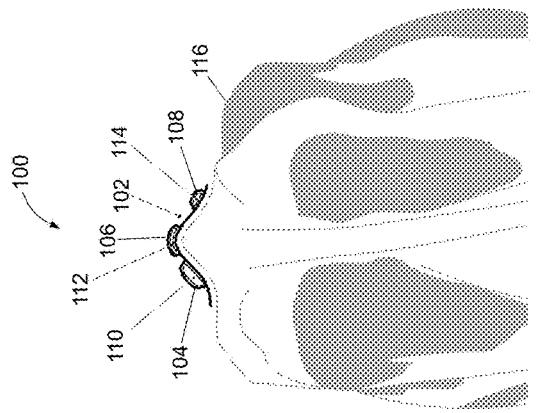
FIG. 2 is rear side view of the exemplary sensor apparatus of FIG. 1 mounted to an animal.

In accordance with embodiments of the present disclosure, exemplary sensor apparatuses and associated systems and methods are provided that include an improved sensor assembly mounting and housing which allows for accurate placement of the sensor assembly on an animal, e.g., a livestock animal, which securely mounts the sensor assembly on the animal, and which protects the sensor assembly from damage. In particular, the exemplary sensor apparatuses can be used to assist in the correct placement and effective mounting of a sensor assembly to an animal, and can be used to protect the components of the sensor assembly from adverse environmental conditions. The sensor assembly of the exemplary sensor apparatuses further includes a combination of a force sensor and an accelerometer to provide a more accurate detection of data representative of a physiological state of the animal.

It should be understood that as discussed herein, "mounting" can refer to securing the sensor apparatus or assembly to an animal and to riding of one animal relative to another animal.

In some embodiments, the sensor apparatus includes a housing which defines a flexible enclosure capable of receiving at least one element of a sensor assembly. In some embodiments, the sensor assembly includes at least one force sensor unit, e.g., a pressure sensor, arranged to measure a force applied in association with an animal. In some embodiments, the force sensor can be a piezoelectric sensor. In some embodiments, the force sensor can be an analog sensor in which resistance changes when force is applied thereto. In some embodiments, the sensor assembly includes a transmitter or a transmitter unit, e.g., a relay, an intermediary device, a repeater, receiver, and the like, arranged to receive a force measurement signal from the one or more force sensors and to communicate to a user or a related electronic device over a communications network animal status information derived at least in part from the received force measurement signal(s). In some embodiments, multiple transmitter units, e.g., intermediate relays, can be used to transmit data over long distances. The force sensor can measure force applied in association with an animal. The applied force can take a variety of forms, e.g., an external force applied to the animal by another source (such as another animal during mounting), forces generated directly by the animal, action of gravity on the animal, and the like. In some embodiments, the force sensor can be arranged to provide a force measurement signal which is indicative of the force measured by the sensor assembly. In some embodiments, the force sensor can be arranged to provide a force measurement signal which is indicative of the length of time a force is applied.

A force sensing unit employed by the sensor apparatus can provide a means for determining one or more aspects of the physiological state of one or more animals. The sensor apparatus can be arranged to communicate to a user or an electronic device over a communications network animal status information derived at least in part from a force measurement signal received from a force sensor unit. This force measure signal can include any combination of the information relating to the magnitude of a force and the length of time the force is applied.

For example, as non-limiting examples, a force sensor unit can act in an animal activity sensing role, where elevated or diminished activity levels may provide information related to the reproductive, nutritional, health and wellbeing states of an animal. For example, a force sensor can be used to detect differences in walking activity of an animal relative to a previous state of the animal, e.g., when an animal is lame relative to normal walking activity. Suitable sensor devices incorporated in the force sensor unit, such as motion sensors (e.g. accelerometers), can measure animal activity, mounting behavior, or other reproductive patterns associated with the absence or onset of estrus in various embodiments. In some embodiments, a force sensor unit can be used to monitor breathing or other associated reflex actions within the respiratory tract to determine animal wellbeing, e.g., elevated sneezing activity, and the like. In some embodiments, a force sensing unit can provide indications of food and water consumption, energy storage, consumption or use, rumen activity, excretion and other functions associated with the intestinal tract or metabolic state of an animal, combinations thereof, and the like. The animal status information derived and communicated by the sensor apparatus can relate to the reproductive status of the animal.

In some embodiments, the flexible enclosure can be formed by two or more flexible sheets bonded together to form an internal cavity. The internal cavity can be arranged to receive at least one element of a sensor assembly. In some embodiments, bonding between the two or more flexible sheets impedes the entry of fluids into the internal cavity defined by the flexible enclosure. In some embodiments, an opening provides access for insertion, removal, or both, of the sensor assembly. For example, the housing can include a retention mechanism operable between an engaged position and a disengaged position. Thus, the housing can be at least partially sealable to inhibit accidental or unintentional removal of the sensor assembly during use. Further, the opening can be fully sealable to impede the entry of fluids into the internal cavity. In some embodiments, the retaining mechanism can include, e.g., complementary protrusions, clasps, holes, combinations thereof, or other features to facilitate retention of the sensor assembly within the housing to prevent or otherwise limit the accidental or unintentional separation of the sensor assembly and the housing during use.

In some embodiments, the flexible enclosure can define a visible surface and a mounting surface. At least a portion of the visible surface can be formed from a material substantially transparent to light. The mounting surface can define a complementary profile to a surface of an animal to which they sensor apparatus is to be mounted. In some embodiments, the mounting surface can be formed from a resiliently deformable material which can return to define a complementary profile relative to a mounting surface on the animal after deformation.

In some embodiments, the sensor assembly includes one or more printed electronic elements on a flexible material. The complementary profile of the mounting surface can guide the placement of the flexible enclosure on to a suitable or optimal mounting region of an animal to which the sensor apparatus is to be mounted. Thus, the sensor apparatus described herein can be used to assist in the mounting of a sensor assembly in a predefined or optimum location in addition to protecting the components of the sensor assembly from physical damage or adverse environmental effects.

In some embodiments, the accurately guided positioning of the sensor apparatus can optimally position the sensor apparatus to receive signals from electronic devices placed in the digestive organs, reproductive organs, implanted within the animal, or combinations thereof, to allow their re-transmission, processing, or both, before re-transmission. In such embodiments, the housing provided can partially house elements or components associated with the sensor assembly, while the remaining elements or components of the sensor assembly can be implanted or inserted into the animal.

The sensor assembly, housing, or both, can include active or passive devices, such as an accelerometer, that may be used by the sensor assembly to provide visual feedback, audible feedback, tactile feedback, or combinations thereof, to guide, confirm, or both, correct placement of the sensor assembly, the sensor apparatus, or both. In some embodiments, the feedback provided by the sensor assembly indicates to a user that data regarding a physiological state of the animal has been collected, detected, or both. In some embodiments, the feedback provided by the sensor assembly can be machine readable, human readable, or both. For example, in some embodiments, one or more cameras or sensors can be used to detect the feedback provided by the sensor assembly. In some embodiments, a switch or button at a central unit, e.g., a processing device, can be activated to activate a feedback signal from the sensor assembly.

Those of ordinary skill in the art will appreciate that the sensor apparatus according to the present disclosure can take a variety of forms and be used in a variety of applications. In some embodiments, the sensor apparatus can be adapted to mount a sensor assembly on the exterior or hide of a livestock animal. In some embodiments, one or more components of the sensor assembly can be mounted or located internally within the animal. In some embodiments, the sensor assembly can be arranged to detect the reproductive status of an animal. Reference herein is made to the sensor apparatus being used to mount a sensor assembly on the hindquarters of a livestock animal where the sensor assembly is arranged to detect and indicate the reproductive status of the animal. However, those of ordinary skill in the art will appreciate that the sensor apparatus discussed herein can be adapted to mount and house a variety of different forms of sensor assemblies and the sensor assemblies need not necessarily be mounted to the hides of livestock animals. For example, in some embodiments, the sensor apparatus can be worn by other animal species or a person, or can provide a mounting for other objects that may undergo an action, such as being exposed to a force or motion. In some embodiments, the sensor apparatus can be used to communicate various other forms of animal status information as discussed herein. Thus, providing a reproductive status assessment should not be seen as limiting.

In embodiments where the sensor apparatus mounts a sensor assembly on the exterior of an animal, the flexible enclosure or housing provided can define a visible surface and a mounting surface. The mounting surface can be formed by at least a portion of the flexible enclosure which in use is placed into contact with the exterior of an animal. Conversely, the visible surface can be formed by at least a portion of the flexible enclosure which is not placed in contact with the exterior of an animal and is therefore visible to an observer when a sensor assembly is mounted.

The sensor apparatus can form or define a flexible enclosure or housing where the enclosure creates an internal cavity arranged to receive at least one element of a sensor assembly. In some embodiments, the entire sensor assembly can be inserted into the internal cavity. In some embodiments, elements of the sensor assembly, such as aerials or electrical connection elements, can extend and project from the internal cavity. The flexible enclosure provided can be fabricated in such a manner or made from suitable materials to result in flexibility in one or more dimensions. Flexibility can allow the flexible enclosure (and potentially the elements of the sensor assembly it encloses) to conform to a particular profile, such as the shape of a mounting portion of an animal.

In some embodiments, the flexible enclosure can be manufactured using one or more methods that enable consistent, rapid and cost effective production. The sensor apparatus can be fabricated in a manner which provides various advantages over traditional electronic mounting methods that are not as robust, economic or reliable for use as an animal sensor as those identified in the present invention. During fabrication, the sensor assembly can be powered on and can be operated in a mode that allows the sensor assembly to monitor a status of the sensor assembly to keep the manufacturing process within an optimum set of conditions for efficient, reliable and economic manufacture. In some embodiments, the sensor assembly can detect failure due to some undesirable aspect of the manufacturing process. Such undesirable aspects of the manufacturing process can therefore be more easily rectified with the additional information from the sensor assembly.

In some embodiments, a switch, such as a magnetically activated reed switch, can be used in the sensor assembly to inhibit operation of the sensor assembly during the fabrication process through close proximity of a magnetic field. In some embodiments, suitable potting agents can be used to protect various components of the sensor assembly, such as sensors, wiring, electronics, power sources, and the like, from damage during fabrication, when in use, or both. In some embodiments, elements of a sensor assembly can be embedded within an interior cavity of a flexible enclosure or housing that is formed in part or in whole using injection molding, over-molding, insert molding techniques, combinations thereof, and the like. In some embodiments, the flexible enclosure can be formed by bonding two or more flexible sheets together. For example, one or more layers of material can be used to encapsulate sensor assembly components such as, for example, connectors, power sources, recharging mechanisms, electronic elements, sensors, communication devices, printed circuit boards, wires, antennas, combinations thereof, and the like.

Laminating techniques can be employed where at least two layers of material sandwich one or more elements of the sensor assembly. Lamination methods can also be used to improve the manufacturing process, performance, reliability, or function of the sensor apparatus. A sealing or bonding step can be included in the manufacturing process for the flexible enclosure to impede the entry of fluids. The sealing or bonding step can provide desired functionalities such as waterproof or other hermetically sealed properties. Sealing or bonding of the flexible enclosure can be achieved using heat, ultrasound, other mechanical, pressure, glue, adhesive, chemical bond, additive, subtractive, fusing, folding, embossing, or other suitable method to fuse components within a closed envelope.

Vacuum forming techniques can be used to provide a unitary sensor apparatus. For example, in some embodiments, heated vacuum forming techniques can be used to fabricate and seal a flexible enclosure. As a non-limiting example, at least two polymer films (such as, for example, polyvinyl chloride (PVC), polyethylene (PE), nylon or layered combinations thereof) can be used to form a unitary flexible enclosure that encapsulates components of a sensor assembly using vacuum forming and heat-sealing techniques.

Loading of one or more components or elements of the sensor assembly can be automated, human-based, or both. The orientation, location, placement, aspect, or other loading method can occur in one or more steps in conjunction with fabrication of the flexible enclosure. In some embodiments, rather than being separately loaded into the inner cavity of the housing, the flexible enclosure or housing can be formed around the sensor assembly components as part of a molding process.

In some embodiments, a former or similar element can be used to pre-shape one or more sheets or films to a desired three dimensional form to define a complementary profile. The profile formed can be complementary to a mounting surface on an animal on which the sensor apparatus is to be mounted, and can be formed in or by a mounting surface defined by the flexible enclosure. In some embodiments, elements or components of the sensor assembly can be placed in appropriate locations (and perhaps pockets) on one of the sheets prior to adding, shaping, and fusing, bonding, or both, a second layer to the first layer. The manufacturing method can be mechanized or automated to simplify operation, increase the yield and efficiency of the process, or both.

In some embodiments, the mounting surface used to form the complementary profile can be flexible yet resiliently deformable and exhibit a material memory to return to the complementary profile after deformation. Temperature changes, including that of an animal, can be used to assist in conforming a housing, attaching a housing, or both, to the animal. In some embodiments, the mounting surface used to form the complementary profile can be fabricated from an encapsulated flexible membrane that contains liquid or semi-liquid materials that deform to accommodate the shape of the surface being adhered to (e.g., an animal in one embodiment), and be subsequently transformed by a chemical reaction into a solid or flexible solid that closely conforms to the shape being adhered to. The surface of the housing can be deformed during manufacture to incorporate structures that can add rigidity to the housing, enhance retention of the housing on the animal, or both.

The surface area of the complementary profile can be chosen to maximize a contact surface area while the sensor apparatus is affixed to an animal for a desired period. In some embodiments, the surface area of the complementary profile can be designed to provide simpler removal of the sensor apparatus from the animal through additional materials, tabs, or other convenient sections. The correct location or positioning of the sensor apparatus can be made to ensure reliable operation of the sensor assembly, while maintaining the position or attachment of the sensor apparatus to the animal to enhance sensor unit performance, enhance sensor unit sensitivity, avoid interference with other sensor units (in the same animal or in another animal), and the like.

Non-limiting examples for a housing location can include, e.g., the rear rump, the tail bone section, one or more legs, hooves, feet, neck, head, ear, under abdomen, combinations thereof, and the like. Flexible enclosures can alternatively or simultaneously be located within one or more cavities, or be located within an animal. For example, where the sensor apparatus is applied for the detection of estrus from animals on heat standing to be mounted by other animals, the location of the flexible enclosure can be located on the back of the animal within an area between approximately 50 mm and approximately 200 mm of the tail. In some embodiments, the sensor apparatus can facilitate the mounting of an enclosed sensor assembly at a point centered on the backbone of an animal approximately 100 mm from the animal's tail.

As noted above, in some embodiments, a contact surface of the flexible enclosure can form a complementary profile to the mounting location or area of an animal to which the sensor apparatus is to be mounted. The complementary profile can assist in correctly locating or positioning the sensor apparatus such that the contact area between the animal and the contact surface of the sensor apparatus is maximized. In some embodiments, the flexible enclosure can include printed, embossed or other marks perceivable to the operator to aid in correct positioning of the sensor apparatus on the animal. Such marks can remain with the housing when it is attached to the animal or can form a template that is removed as part of the attachment process. In some embodiments, the flexible enclosure can include features, such as perforations and fiduciary marks, to facilitate autonomous attachment to an animal. In some embodiments, the flexible enclosure can include features to provide compatibility with a manually operated tool to facilitate rapid or reliable attachment of the sensor apparatus to the animal.

Various portions of the materials used to form the flexible enclosure can be selected for characteristics such as being waterproof, water-tight, or water resistant. Materials used can include, e.g., polymeric substances, silicones, rubbers, multi-layer films or laminates, or other materials such as glasses, metals, or other suitable materials. The materials used can be breathable, allow gas or liquid exchange, or both, in a known or controlled manner from within the internal cavity of the enclosure or housing, from the animal onto which the sensor apparatus is attached, or both.

In some embodiments, the materials used can be opaque, transparent, semi-transparent, or tinted to light or other parts of the electromagnetic spectrum. In some embodiments, materials can be colored as perceived by the human eye to give a specific spectrally distinct appearance. Material opacity or transparency, housing opacity or transparency, or both, can be used to enable optical or other electromagnetic signals to be transmitted, blocked, or both. Dopants, coatings, or both, can be used with or applied to the housing components and materials. The dopants, coatings, or both, can include fillers, polymers, dyes, paints, fluorescent, luminescent, phosphorescent, plasmonic, or other organic or non-organic materials. For example, in some embodiments, where the flexible enclosure defines a visible surface, at least a portion of the visible surface can be formed from a material substantially transparent to light. Visible light signals can thereby be transmitted through the flexible enclosure by the sensor assembly. In some embodiments, the sensor assembly can include a photovoltaic power supply system.

Reflective, non-reflective, or both, layers or materials can be applied to various surfaces or elements of the flexible enclosure. Reflective layers can be provided using metals or other suitable components or combinations of compounds such as by using one or more thin film layers. Materials can be chosen that provide an extended or restricted lifetime of the flexible enclosure. Materials can be chosen such that the flexible enclosure or portions thereof (e.g., detachable portions of the flexible enclosure) can be biodegradable.

In some embodiments, the sensor apparatus can include components to assist in the operation of the sensor assembly in addition to the flexible enclosure or housing. For example, in some embodiments, the sensor apparatus can provide or incorporate shaping elements to distribute light transmitted by the sensor assembly to facilitate observation of visual signals generated by the sensor assembly. In some embodiments, the sensor apparatus can include a rigid mounting plate or similar component within an interior cavity or attached to the flexible enclosure to provide a surface to which elements of a sensor assembly can be mounted.

In some embodiments, the sensor apparatus can be attached to an animal by any convenient means to ensure reliable operation. Attachment can be made through, e.g., glues or other adhesives, biological agents, staples, other adhering methods, combinations thereof, and the like. The method of attachment used can provide a temporary, semi-permanent, or permanent method of attachment. In some embodiments, the flexible enclosure or housing can be removable, repositionable, or replaceable.

In some embodiments, the flexible enclosure can be attached to the animal with an adhesive label which is exposed upon a user removing a protective layer. In some embodiments, a double-sided adhesive pad can be used to affix the flexible enclosure to the animal. In some embodiments, the method of attachment used can involve the application of an adhesive that is spread or applied from a pressurized source such as a canister. In some embodiments, the flexible enclosure can be attached with a device activated by an electronic signal resulting from an instruction received remotely.

In some embodiments, the method of attachment used can allow the flexible enclosure to be removable, reversible, or both. Disposable elements can be used to provide a simplified workflow. The method of attachment can be suitably flexible to allow the flexible enclosure to be partially shifted and then return to an affixed position. The flexible enclosure can be removed using force, using an assisted method (such as by using a tool or a suitable compound or agent). The method of attachment used can provide suitable protection of sensor assembly elements during attachment, use, and removal. Perforations in various areas of the flexible enclosure can be provided.

The sensor apparatus, sensor assembly, or both, can require a suitable power source or energy storage to function with acceptable performance under a range of conditions. In some embodiments, electrical energy can be provided by use of an energy storage mechanism, such as a chemical battery (electrical), super capacitor, other suitable devices, combinations thereof, and the like. In some embodiments, electrical energy can be provided by, e.g., a fuel cell, a mechanical storage element (such as a spring), compressed air, photovoltaic elements, combinations thereof, and the like. Electrical energy can be provided near or in real-time by a suitable generating element, such as a photovoltaic cell, fuel cell, a mechanical device, a motion-based device, combinations thereof, and the like. In some embodiments, power can be provided by an energy transport system, such as inductive power transfer, optical power transfer, microwave power transfer, combinations thereof, and the like.

In some embodiments, an energy source, an energy harvesting system, or both, can be incorporated within the sensor apparatus, located in a separate compartment within the housing, dispersed throughout the housing, dispersed within the sensor assembly, and the like. In some embodiments, the energy source can be of single-use type (e.g., one discharge or use cycle) and replaceable. In some embodiments, the energy source can be rechargeable, partially rechargeable, replaceable, and the like. Recharging or replacement of an energy source can occur while the sensor apparatus is in use, prior to use, after a period of use, combinations thereof, and the like. Recharging of the energy source an occur in a contact or non-contact manner.

In some embodiments, ports or apertures can be provided within the flexible enclosure to allow exterior access to physical electrical connectors or plugs connected to elements of the sensor assembly. The perimeter of the relevant portion of the sensor assembly can therefore be sealed around the plugs or connectors to impede fluids entering the internal cavity of the flexible enclosure. In some embodiments, the materials used to form various portions of the flexible enclosure or housing can assist in the inductive recharging of energy supply systems employed by the sensor assembly. For example, an inductive recharging system can be placed in proximity to the flexible housing of the sensor apparatus to allow the energy supply of the sensor assembly to be recharged.

The sensor apparatuses discussed herein provide a low cost, robust, detection of motion, acceleration, force or impact, pressure, associated changes, combinations thereof, and the like. Mounting behavior actions can be monitored using a binary mechanical switch such as, for example, a pressure switch (e.g., Model FSM4JH manufactured by TE Connectivity Ltd.). A force sensor unit that provides information related to the acceleration experienced in one or more axes can be used to monitor an animal state (e.g., Model MMA8453Q manufactured by Freescale Semiconductor, Inc.). The accelerometer sensor can be used in a determination of reproductive state of an animal through motional activity, mounting, or the like.

In some embodiments, force sensitive sensors, detectors, switches, or strain gauges are configured to enable variable force to be monitored for further processing (e.g., force sensitive resistor Model FSR402 manufactured by Interlink Electronics, Inc.) can be used. The absolute, or relative, force can be used to determine other characteristics of mounting behavior, e.g., light or heavy mounting. Force or pressure sensitive switches can be housed, mounted, or modified in a manner that increases the sensitivity, reliability, or accuracy of their operation.

Those of ordinary skill in the art will appreciate that a variety of different forms or types of force sensor units can be employed in conjunction with the present invention. In some embodiments, the sensor apparatus can employ a single force sensor unit. In some embodiments, the sensor apparatus can employ two or more separate force sensor units, e.g., same types of force sensor units, different types of force sensor units, and the like. In some embodiments, any combination of the arrangements of sensor units discussed herein can be encapsulated in one or more interior cavities of a housing.

In some embodiments, load distribution elements can be used to alter the function, sensitivity, or both, of force sensor units. For example, a silicon membrane switch can be used as a robust and long-lasting mechanical sensor of mounting behavior. In some embodiments, a silicon membrane switch can form part of a mechanical housing. A switch can be formed using a sandwich of materials, e.g., using layers of various types that contain conductive properties and which are suitably connected to electrical detection and measurement systems.

In some embodiments, sensor guards can be implemented with the sensor apparatus to ensure reliable operation of mechanical sensors. Such guards can be implemented in a manner that limits false activation, inaccurate readings, protects the sensor and associated components from damage during fabrication or use, provides a threshold type characteristic, and the like.

In some embodiments, the sensor apparatus can include a plurality of sensor units, with one or more sensor units being provided in addition to a force sensor unit or units. These additional sensor units can be employed to assess the effect of other variables or parameters associated with an animal in addition to the measurement of a force applied in association with the animal. In some embodiments, a sensor assembly unit can incorporate one or more sensor components or subsystems to determine motion, acceleration, orientation, aspect, switch action, tactile phenomenon, touch phenomenon, temperature, light, sound, temperature, location including global positioning, (ruminant) pH, chemical or biochemical status, electromagnetic signal or a combination of any of these variables. Various sensors and combinations of sensor unit data can be combined by way of weighting functions, multiplicative algorithms or other mathematical functions to improve the accuracy and reliability of measurements.

Sensor components or subsystems can be located near each other, within the same device or housing, or in a plurality of housings. Sensing systems can communicate with other sensing systems (on an animal or on multiple animals or mounted on permanent or mobile physical structures or associated with or used by human operators). One or more of the sensors, devices, or both, can be used to provide a reference or calibration function.

In some embodiments, sensor assembly units can receive information from other devices either inside the animal (including intrauterine or intravaginally), on a surface, external, or distant from the animal, combinations thereof, and the like. Such devices can be used for breeding and animal husbandry to integrate collected information with the animal sensing systems, process and analyze the information to improve animal breeding worth, conception rates, improved herd management, and the value of a herd as a whole, and the like.

In some embodiments, sensor assembly units can be deployed inside an animal in a variety of embodiments. For example, in some embodiments, several similar sensors assembly units can be distributed throughout a sensor body housing to improve accuracy of detection of the target animal status. This approach can be used to distinguish mounting activity from head bumping, jostling by other animals or other motion. In some embodiments, an opto-interrupter can be used with a lever that comes down to block, or partially block, a beam of light. The opto-interrupter sensor can be arranged to digitally detect only the presence or absence of actuation of the lever. In some embodiments, the opto-interrupter can include an analogue configuration and use partial obstruction of the beam to provide an estimate of an actuating force.

As indicated above, one or more sensor assembly units can be used to determine the reproductive state (or health) of an animal where the sensor units employ other transduction techniques to force measurement. For example, capacitive sensing techniques can be used to detect the presence, absence or distance to an object, such as an animal within a certain zone, with respect to the location of a sensor assembly unit. The capacitive sensing technique can be used to determine whether the sensor assembly unit is housed on an animal or not, or on the ground. Optical reflection, optical absorption, radio frequency strength, or combinations thereof, from sensors on other animals can be used to determine proximity of animals in the vicinity of a sensor assembly unit. In some embodiments, microwave, radio wave, or other parts of the electromagnetic spectrum can be used to monitor animal behavior to determine the reproductive state of an animal of interest. Other sensing mechanisms can include magnetic (e.g. Hall Effect), temperature, acoustic, and motion to determine a physiological state of the animal.

In some embodiments, one or more sensors or sensor assembly units can be used concurrently to derive or detect the reproductive status or other state of an animal. For example, a mounting force provided by an accelerometer (one or more axis motion) can be used to determine and to improve the accuracy of mounting behavior. Force or pressure associated with animal contact can provide increased confidence in measurement of a reproductive state. Proximity of animals can be used to more accurately assess whether mounting behavior has occurred and standing heat activities. In some embodiments, mounting duration can be indicative of a physiological state of the animal (often referred in common parlance as "standing to be ridden") which is indicative of a behavioral state of *oestrus*.

Sensor assembly units that are within or are attached to the exterior surface of an animal can be used in combination to determine the reproductive, nutritional, or health state of an animal. In some embodiments, physical or biochemical measurements (such as pH or temperature) from within the rumen, uterus, other cavity or other location within the animal can be combined with external data (such as mounting activity or other motion) to determine the reproductive or health state of an animal.

In some embodiments, a sensor assembly unit can utilizes a mechanical switch such as, for example, a pressure switch (e.g., Model FSM4JH manufactured by TE Connectivity Ltd.) and a motion sensor (e.g., Model MMA8453Q manufactured by Freescale Semiconductor, Inc.) to combine sensing methods and improve the accuracy of heat detection activity. In some embodiments, a pressure (e.g., ratio of force to area over which force is distributed) sensitive element and a motion sensor can be combined to perform heat detection monitoring Those of ordinary skill in the art will appreciate that a sensor assembly unit employed by the sensor apparatus can be designed to be fabricated and function over a wide range of temperatures, light intensities, chemical exposures, force, impact, environmental conditions, whether located on or within the animal (being exposed to water, temperature, light, biological fluids and materials, foreign substances), abrasion, and re-use. In some embodiments, a sensor assembly unit can harness, rejection, or both, light, heat, or both, in a passive or active manner either directly or to generate electricity for the sensor unit.

In some embodiments, the sensor apparatus can be adapted to mount a sensor assembly unit on the exterior or hide of a livestock animal. The location of a sensor assembly unit on the animal can be critical for it to accurately perform the operations described herein. In some embodiments, for detection of estrus from the animal on heat, standing to be mounted for other animals mounting behavior, the location of the flexible enclosure, e.g., housing, can be centered on the back of the animal within an area between approximately 20 mm and approximately 50 mm proximal to the tail. In some embodiments, the sensor apparatus can be employed to mount a sensor assembly unit at a point centered on the backbone of an animal approximately 30 mm from the tail of the animal. In some embodiments, a sensor assembly can employ electronic placement guides, such as through the use of an accelerometer or capacitance, to assist in accurately positioning the sensor apparatus on the animal.

In some embodiments, various forms of sensor assembly units can be mounted on or within the body of the animal in different locations, orientations, and attachment manners. In some embodiments, a housing location can include the rear rump, tail bone section, one or more legs, hooves, feet, neck, head, ear, under abdomen, and the like. In some embodiments, the sensor apparatus can be used to deploy sensor assembly units within one or more cavities, or to be located within an animal. Those of ordinary skill in the art will appreciate that the combination of purposeful or accurate sensor assembly unit location, placement, or both, combined with the data gathered can improve the operating performance of one or more measurements provided in accordance with the present disclosure.

In some embodiments, a sensor assembly unit, a transmitter unit, or both, can be enclosed within the housing of the sensor apparatus. The transmitter unit can be arranged to receive a force measurement signal, an accelerometer signal, or both, from one or more sensors and to communicate to a user animal status information derived at least in part from the received measurement signal or signals. In some embodiments, a sensor assembly unit can be combined with a transmitter unit to distribute information or data sourced from the output of the sensor assembly unit. In some embodiments, the sensor apparatus can include transmitter units which are not directly attached to sensor assembly units.

A variety of transmitter unit devices and methods are envisaged to assist with the transfer of information to and from sensor assembly units. In some embodiments, transmitter units can include telecommunication hardware, software, firmware, and the like. In some embodiments, transmitter units can use other communication mechanisms. Transmitter units can be co-located with or within a microprocessor or computer, each of which includes a CPU. Transmitter units can operate independently or in combination with additional transmitter units. In some embodiments, one or more transmitter units can be used to enable large spatial range, a number of sensor assembly units to be operated, to increase the reliability of data transport, and the like. In some embodiments, one or more transmitter units can be attached to one or more animals. Other communication techniques, such as mesh networks, can be used to enhance connectivity.

In some embodiments, transmitter units can be connected to each other, a central connection mechanism, or both, via physical wires or through wireless telecommunication technologies (e.g., Ethernet, USB, RS232, RS485, Wi-Fi, Cell Phone, microwave, light, ultra-narrow band (UNB) communication, other radiofrequency protocols that operate over short and extended ranges, and the like). In some embodiments, transmitter units can be portable. Transmitter units can utilize many or all parts of a portable device, such as a cell phone, tablet, or the like. In some embodiments, transmitter units can require animals (and therefore sensor assembly units) to be located within a certain proximity in order for communication to occur. In some embodiments, communication through transmitter units can require line-of-sight.

In some embodiments, the function of transmitters can include displaying to show information relating to steps to prepare a sensor assembly unit for monitoring, attachment, or both, to an animal, storing data collected and making the information available directly to an end user via visual, audible, or tactile methods, making the information available directly to a local or remote computer, making the information available through a hosted webserver, or one or more Global Positioning Systems (GPS) which provide information for setting up the sensor system. In some embodiments, GPS information can be used to determine whether a sensor assembly unit is in range of radiofrequency transmitters and receivers, to provide general location information for other conception, breeding, herd, or veterinary processes, provide a time reference, and the like.

In some embodiments, transmitter units can operate using one or more suitable power sources, such as battery or main supplies. Transmitters can include sensors or be connected to sensor assembly units which detect information such as ambient temperature, rainfall, soil conditions, wind direction wind speed, phase of the moon, or other events that are related to animal herd or farming, farm management and economic practices, including predictive measures such as water and feed use and planning, effluent management, health measures and other environmental influences. In some embodiments, transmitters can be located at one or more stationary positions. In some embodiments, transmitters can be mounted on an elevated position where natural or man-made landscape offers barriers to communication to improve communication reliability, coverage, or both. In some embodiments, transmitters can be mounted on one or more non-stationary (mobile) platforms including animals, vehicles, humans, or other movable objects. In some embodiments, transmitters can be coupled with one or more sensor assembly units within the same or a different housing. In some embodiments, transmitters can be self-propelled, remote controlled, or both. In some embodiments, transmitters can operate on tracks or other guidance devices. In some embodiments, transmitters can be lofted on tethered or untethered balloons. Such mounting schemes can enhance performance where natural or man-made landscape offer barriers to communication with sensors to improve communication reliability, coverage, or both.

Information, data, calculated values, other useful information, and the like, can be transmitted to assist in the function of the sensor apparatus. Methods for transmitting information of partial or full data sets can include, e.g., electromagnetic (including radio, microwave, visible, UV, infra-red components of the electromagnetic spectrum), acoustic, pressure, thermal or other well-known communication mechanisms, and the like. Optical electromagnetic signals can be pulsed, modulated, digitally encoded (e.g. Morse code style), and the like. Long range radio frequency methods can be employed to enable large-area operation and communication with sensor assembly units or to reduce the number of transmitter units required. Communication can occur in a one way or multi-way fashion between two or more devices, one device and an operator, or both. Data can be transmitted on demand in packets that contain one or more data sets, in multiple sub-packets that when combined contain a complete packet, or both. In some embodiments, other communication systems such as cellular telephone towers, satellites, vehicular, and other devices can also be utilized to enable or enhance transmission.

In some embodiments, transmission, communication, or both, can occur on demand, at preset intervals, synchronously, asynchronously, and the like. In some embodiments, transmission can occur at a certain time of day, week, month, or may be made outside a known period. Under certain circumstances, non-transmission events can occur. For example, non-communication can occur to avoid confusion between one or more sensing devices, sensing device sets, or both, and a receiving device, indicate a particular animal state, indicate a sensor state (e.g., functioning properly), limit or save energy use, and the like. In some embodiments, mobile phone technology or components can be used to transmit data, receive data, or both. Internet connectivity can be provided to enable upload, download, control, data storage capability, and the like.

In some embodiments, data can be stored locally by a transmitter unit until successful receipt is acknowledged to improve system reliability, data integrity, reduce power use, and the like. In some embodiments, provisions can be employed to improve reliability such that data can be stored or resent periodically in the event that data is not acknowledged by one of the system components. Sending data, resending data, or both, can occur at random intervals to avoid collisions from transmission by multiple transmitters units becoming synchronized. The acknowledgment of transmitted data can include additional information to reconfigure the sensor such as, for example, turning a signaling LED on or off, decommissioning a device, instructing the system to wait for further information or instructions to cease, change, or both, monitoring behavior, and the like. To aid the user, operator, or other relevant person, user interface alerts can be used to specify an animal sensor assembly unit state, an animal reproductive state, an animal state, or other relevant information so that management practices can be conducted in an efficient manner.

In some embodiments, a transmitter unit can function as a user interface. For example, when used as a user interface, the transmitter unit can utilize one or more human senses (e.g., touch, vibration, sound, an audible tone, sight, a visible indicator, and the like) to alert the user as to the operational state of the animal sensor, the reproductive or other state of the animal, or other environmental factors such as temperature, time, and the like. For visible indication, user interface alerts can include text, light, reflection or transmission, or both, of light, brightness, duration, frequency, wavelength, position, geometry, shape, direction, on-off combination, traffic light, flash length, frequency, or other user-visible code. Visible indications can be enabled through altering animal state, such as by movement. For example, an audible tone can direct an animal to move in a particular manner or direction.

Signals produced by transmitter units can be dual purpose, such as where a human can observe a particular status indication while a non-human reader can read the same information, more information, or less information. For example, a number of flashes that can be visible to the human observer can contain information (e.g., a binary code) that is not detectable by the human observed, but that contains the same, less or yet further information (e.g., data).

Aspects related to color-blindness can be considered when developing such systems to ensure an accurate user interface, and can include or exclude certain colors from the user interface set, but can, for example, use one or more other factors to clearly indicate a sensor state of an animal as a means to represent a desired animal state.

In some embodiments, alerts can be provided for a sensor assembly unit when not paired or in contact with an animal. For example, the absence of motion can be used to signify that a sensor is not on an animal, is not working properly, or has fallen off an animal. Data or information derived in conjunction with the sensor apparatus can be coupled with devices known as augmented reality (AR) systems. AR systems can overlay information on the user's visual field through electronically enhanced apparel as the user observes animals on which the sensor apparatus has been deployed or attached. This information can be linked directly to specific animals identified by position information transmitted by a sensor, by physical characteristics, or both. In some embodiments, this information can be presented in summary form providing statistics or aggregate data for animals in the general vicinity of a transmitter station.

Data or information derived in conjunction with the sensor apparatus can be communicated to a user by way of assisted means to direct the attention to particular animals. For example, a user can wear glasses, or a similar passive tool, incorporating appropriately selected waveband filters to enhance the contrast of visual signals emitted by the sensor. In some embodiments, acoustic techniques can be used to assist the user whereby looking in a certain direction, such as at an animal of interest, causes an audible tone.

In some embodiments, one or more sensor units can be used to determine the status of an animal and can provide user alerts related to a particular animal, a sensor unit state, or both. For example, animal states can include standing heat, estrus, or other reproductive condition, or even the act of giving birth. Alert state can indicate that an animal should be inseminated or otherwise managed for reproductive purposes (e.g., drafted or otherwise isolated or positioned). In some embodiments, sensor alert states can include, communicate, or both, malfunction or potential malfunction, compromised conditions such as faulty sensor(s) low battery, removal from animal or incorrect attachment, communication errors, self-test results or other diagnostic methods. In some embodiments, alerts can be used to assist in finding a sensor assembly unit detached from an animal. User alerts can be provided for and associated with other reproductive, health, or nutritional herd management occurrences, activities, and the like. In some embodiments, an animal unwell state, as determined by one or more sensor assembly unit outputs, can be communicated as an alert. For example, the observation that an animal is moving (motion) less than usual or than it should be, or relative to other animals or historical information can result in an alert related to the reproductive, health or vital state of the animal.

In some embodiments, the sensor assembly units cab include data processing capabilities using, for example, a microprocessor, such as an ATMega644P. Data processing capabilities can include coordinating data collection from multiple sensor assembly units (either on-board or in close proximity), processing the data collected from the force sensor and the accelerometer through an algorithm to determine, for example, if the host animal is in heat, processing to reduce the quantity of data that needs to be relayed over a communications link, filtering data collected from sensors to reduce noise or alerting an artificial insemination or veterinary technician or other person to take a particular action. The sensor assembly units can store data collected to aid in future decision making, as well as transmission to an external system. Sensor assembly units can source data from external systems, including on-line databases and other sensor systems, to optimize breeding to increase the conception rate or other important characteristics that increase the value of the animal, including but not limited to sires and cows.

In some embodiments, sensor assembly units can take advantage of low power modes built into the microprocessor. For example, a microprocessor can be configured to remain in a low power mode until "woken" by an external event provided by, for example, an animal sensor assembly unit, a periodic pulse provided by an external clock, and the like. Sensor assembly units can include a real-time clock for providing an independent time stamp to data collected by a microprocessor. A real-time clock alarm function can be used to wake the microprocessor of the sensor periodically.

Data storage can be managed in one or more ways, such as local (within a sensor assembly unit), at a transmitter unit, on other sensor assembly units, or remotely (within a remote storage means, such as computers, servers, or remote servers). Data can be retained within one or more of the methods or systems described herein, whether communicated or not. Data can remain on a sensor assembly unit, transmitter, local computer, remote computer or other storage means until successfully retrieved by a desired data storage step, after successfully retrieved by a desired data storage step, or both.

Sensor assembly units can be operated in any mode that enables 24 hour multi-day operation. Sensor assembly units can be designed to enable the monitoring of an animal continuously, in an event-driven manner, synchronously, or asynchronously with respect to time or certain time periods. Clock, time of day features or other herd management activity knowledge can be used to sense, communicate, or both, sensor assembly unit status or data. For example, an animal can be feeding, being milked, moved, being inseminated, or undergoing some other herd management activity. This knowledge or associated data can be used to conduct further herd management actions, such as isolating or separating animals, readying animals for artificial insemination, and the like. Sensor assembly units can use the measurement of ambient light, time of day, or both, to determine daytime, nighttime, or both, sensor assembly unit operation and any associated activities. Operating the sensor assembly units in these modes can advantageously enable stretched battery lifetime while maximizing operational functionality. It is envisaged that in some embodiments, sensor assembly units can be operate for 60 days or more when in an active state, and 12 months or more when in a non-active state.

In some embodiments, one or more strategies can be used detect the unintentional detachment of a sensor assembly unit from an animal and to aid the recovery of the sensor assembly unit. If a sensor becomes removed from an animal, various sensing techniques, such as temperature, motion, location sensing, and the like, can be used to determine that such an event has occurred, and to assist with locating the sensor. For example, in some embodiments, a sensor assembly unit, transmitter unit and a communication system can enable an alert system. In some embodiments, user can enable an alert system. In some embodiments, an alert system can involve light (including certain colors, color changes, and on-off cycles), sound, vibration, radio frequency signal or other assistance mechanisms, whether intrinsic or activated, to allow a user to locate a sensor assembly unit. In some embodiments, an alert system can provide proximity or other location information. Those of ordinary skill in the art will appreciate that a sensor assembly unit can activate alternative signaling mechanisms (such as SMS texts, e-mails, LEDs or buzzers) automatically if it fails to communicate data with a transmitter device for a prolonged period to aid in location of the sensor.

Electronic animal sensing systems can include a suitable power source, storage mechanism, or both, to enable the reliable function and acceptable performance under a range of conditions. Power can be provided by use of an energy storage mechanism, such as a chemical battery (electrical), super capacitor, or other suitable device (such as fuel cell, mechanical storage element such as spring, compressed air, solar, and the like). Power can be provided in near real-time by a suitable generating element, such as a photovoltaic cell, fuel cell, a mechanical device, a motion-based device, combinations thereof, and the like. In some embodiments, power can be provided by an energy transport system, such as inductive power transfer, optical power transfer, microwave power transfer, and the like.

In some embodiments, the power source can be of a single-use type (e.g., one discharge or use cycle), replaceable, and the like. The power source can be rechargeable, partially rechargeable, or replaceable. Recharging or replacement of a power source can occur while the animal sensor apparatus is in use, prior to use, after use, or combinations thereof. Recharging of a power source can occur in a contact or non-contact manner (where contact might involve the physical connection of electrically conductive contacts, and where non-contact might involve inductive charging methods). In some embodiments, inductive methods can be used when a sensor assembly unit is in appropriate proximity with respect to a charging means. Conductive materials (such as certain conductive silicon materials) can be used for connection elements within the sensor assembly unit.

When a rechargeable power source is employed, a charging system can be used to reduce the labor required for recharging the sensor apparatus. In some embodiments, one or more sensors or transmitter units can be simultaneously charged by the charging station. In some embodiments, one or more spring-loaded contactors can be used to provide rapid attachment of the charging supply to one or more sensors or transmitter units. In some embodiments, a hole in a sensor or transmitter unit housing that mates with a suitable protrusion on the charger (or vice versa) can be employed to provide rapid coupling of the charger. In some embodiments, inductive charging systems can be employed to simplify user operation, expedite charging of one or more sensors, transmitter units, or both, combinations thereof, and the like. One or more sensor unit features can be used in order for recharging to be made possible whilst enabling ease of use and robust operation. In some embodiments, conductive polymer interconnects can be embedded within a unibody or multipart housing, thereby providing a flexible, watertight electrical connection.

In some embodiments, a commissioning station can be used to reduce labor and facilitate preparation for attaching sensor assembly units and transmitter units to animals. The commissioning station can include one or more sensors to identify a particular sensing assembly unit from a plethora of operating or non-operating sensing assembly units in the vicinity of the commissioning station. For example, identification can be through a bar-code, a quick response code (QR code), a radiofrequency identification tag (RFID tag), transmission by the sensor over a coded light pulse, audio, tactile, thermal, or radio signal. Identifying information read by the commissioning station can be printed, physically structured, electronically recorded, and the like, within the sensor body.

The commissioning station can include one or more sensors to identify a particular artificial insemination straw from a plethora of straws, and likewise the commissioning station can include one or more sensors to identify a veterinary device used by an operator to determine useful characteristics of an animal related to health, metabolic state, reproductive state, nutritional state or general wellbeing. In some embodiments, sensors can include methods for measuring fetus health. The commissioning station can include one or more user operated inputs to initiate, confirm or cancel a commissioning operation. Such inputs can include push button switches, touch screen interface elements, or other human interface techniques. Some, none, or all of the functions of the commissioning station can be incorporated in a sensor assembly unit, transmitter unit, a charging station, or vice versa.

In some embodiments, a reprocessing system can be used to receive, prepare, or both, sensor apparatus units for use or re-use. The reprocessing system can provide modifications to sensor assembly unit housing exterior, interior, or components to render the sensor assembly unit capable of re-use. The reprocessing system can strip materials used in the prior attachment step (such as glues, adhesives, adhesive layers, and the like) such that a new attachment material or layer can be applied. Reprocessing can include a component removal mechanism or step whereby various components or materials are removed and replaced. For example, part or all of a mechanical housing can be removed and replaced. In some embodiments, components from within the housing can be replaced (e.g., batteries, sensors, wires, mounts, connectors, and the like). The reprocessing system can apply a new adhesive layer or layer that will accept adhesive. Adhesives can be applied using direct contact (e.g. brush, sponge, spray, adhesive layer, sheet, or film). In some embodiments, the reprocessing system can reprogram a sensor assembly unit. In some embodiments, the reprocessing system can replace or recharge a power unit within the sensor apparatus. The reprocessing system can recondition a sensor apparatus unit in any other way that returns the system to a previous state prior to use, to add functionality, or both. The reprocessing system can permanently mark or record visually, electronically, or by some other readable or recognizable means, the reprocessed state of the sensor apparatus unit. The state can include the number of times the sensor apparatus unit has been reprocessed, or the date the sensor apparatus unit was reprocessed. The state can include the performance specifications of the sensor apparatus unit, identification of the reprocessing system, identification of the operator, or both.

In some embodiments, the sensor system can include an update server. In some embodiments, the server can be a computer that is or can be in communication with one or more computers, often referred to as a network. An update server can facilitate field updating of software, firmware, or both, installed on microprocessor systems in a sensor apparatus, transmitter unit, charging station, commissioning station, combinations thereof, and the like. The update server can provide updates by radio link, physical electrical connection or optical-link. Some, none, or all of the functions of the update server can be incorporated in the transmitter unit, charging station, commissioning station, or vice versa.

The update server can be provided to enable the sensor apparatus units, transmitter units, or both, to be altered, improved, upgraded, and the like, or to take other action whereby software is altered, modified, or replaced to upgrade the devices. The upgrade can occur during a commissioning step, recharging step, during inactive operation, during active operation, combinations thereof, and the like. The upgrade can occur using radio frequency methods, via direct wire contacts, via inductive coupling, and the like. In the case of inductive coupling, the software update can share or be independent from an inductive charging system. The upgrade can be user initiated (such as, for example, by pressing a button on a sensor apparatus housing, activating a reed switch by a magnet, and the like) or be initiated by a command sent from a second device (such as a transmitter). A sensor assembly unit or transmitter unit can periodically check for updates by contacting an update server to self-determine if the device has the latest version of the software. Updates can be signed by a cryptographic key to indicate that the update is authorized or valid for reasons of accuracy, security, or enhance operation. Certain update data can be compressed using one or more algorithms to facilitate more efficient use of the data transport path, to minimize errors with upgrades, use data, and the like. Updates can include checksum methods to ensure the data has not been corrupted during transmission, to minimize the probability of loss of valuable data that has been produced is likely to be produced by the sensor assembly, transmitter units, or both, for the intended application, and the like.

When sensing animal characteristics, it can be important that a particular sensor assembly unit measures and is identified accurately with an animal of interest. In some embodiments, this identification can be achieved by identifying an animal with a unique multiple digit number or equivalent code against which all of the animal's information is recorded. To reduce the complexity of ensuring coupled identification of a sensor assembly unit and an animal, a pairing system can be used to link the sensor assembly and the animal. For example, in some embodiments, a commissioning station can include a display device to present information to an operator to aid the efficiency or reliability of the process used to identify and pair devices to allow effective and efficient communication between sensor apparatuses. Information to do this can include the identification of the animal or sensor assembly unit, status of the animal, the sensor assembly unit, other external sensor units, and the like.

In some embodiments, status information used in a pairing system can include breeding data, artificial insemination straw identification, veterinary device identification, and the like. In some embodiments, unique intrinsic biometric characteristics can be used for identification, such as retinal images. In some embodiments, sensor status information can include sensor identification, battery charge level, active state self-test diagnostics or results, previous use, time, other performance metrics, and the like.

In some embodiments, extrinsic devices can be used for pairing. RFID devices can be used on animals through ear tags, implantable devices, or other mechanisms. A sensor apparatus unit can utilize at least one distinguishing feature to become paired or matched to the animal for some period of time, including permanently. In some embodiments, the pairing step can occur during the commissioning or attachment of the sensor apparatus to the animal (before during or after attachment), where, for example, the RFID device and code is recorded on the unit is associated with the sensor apparatus by some means (e.g., at a transmitter unit or in database software). In some embodiments, the commissioning step can use light transmission (emission and detection) means to operate. In some embodiments, other unique identification means or informational transfer can be utilized, e.g., bar codes, QR codes, and the like.

In some embodiments, decommissioning or disassociating a sensor apparatus or transmitter unit from the animal can occur, e.g., after a pre-programmed period of time, on attachment of the sensor apparatus to a charging system, on command from a transmitter station, and the like. The decommissioning or disassociating step can occur where it is desired that a sensor apparatus be used in association with another animal or for another purpose.

In some embodiments, at a certain time, at or after a certain state or number of animal or sensor apparatus states, it may be desirable to remove one or more sensor apparatuses from one or more animals. In order to aid the removal process, one or more alerts can be provided by sensor apparatus, transmitter unit, charging station, commissioning station, update server, any other related device (including but not limited to portable electronic devices), and the like. For example, the sensor apparatus, transmitter unit, or both, can alert the user either through light flashing on the sensor apparatus, messages on the transmitter, delivered to a computer via the internet from a server, or combinations thereof. The cause for removal of the sensor apparatus can be due to the reproductive or health condition of the animal, loss of power, communication, or other condition. Removal of the sensor apparatus from the animal can be through electronic disengagement of the sensor with the animal or can require special techniques using solvents, tools or mechanical techniques.

In some embodiments, the sensor apparatus, sensor assembly, transmitter unit, combinations thereof, and the like, can be designed or fabricated to enable re-use. If the unit contains or requires a power storage unit, such as a battery, the unit can provide necessary means to re-charge. For example, one or more contacts or contact points can be provided within or on the sensor apparatus. In some embodiments, recharging circuitry can be contained to control, monitor, or both, the status or progress of a charging cycle. In some embodiments, the power storage unit can be replaceable as a means for re-using the sensor apparatus. For example, batteries can be used and replaceable in a simple step or number of steps. In some embodiments, sacrificial layers or materials can be used to gain access to a power source, and can be replaced with the same or different layers or materials.

In some embodiments, alternative power sources can be used, including those that contain a gas, fuel, pressure source, flywheel, or other chargeable method or mechanism. The power source can be provided entirely or partially by a non-rechargeable or somewhat real-time source, such as motion or mechanical action (of the sensor system or some other object), electromagnetic radiation (solar energy or other electromagnetic source), heat (provided by the environment or animal), acoustic energy, and the like. In some embodiments, the method of recharging can be performed using a clip, using magnetic contact methods, the mass of the sensor, or some other means that provides electrical contact to suitable exposed contacts on the sensor apparatus. In some embodiments, inductive or wireless charging can be used by providing a means for locating a sensor apparatus appropriately with respect to a charging unit.

Figure 1:
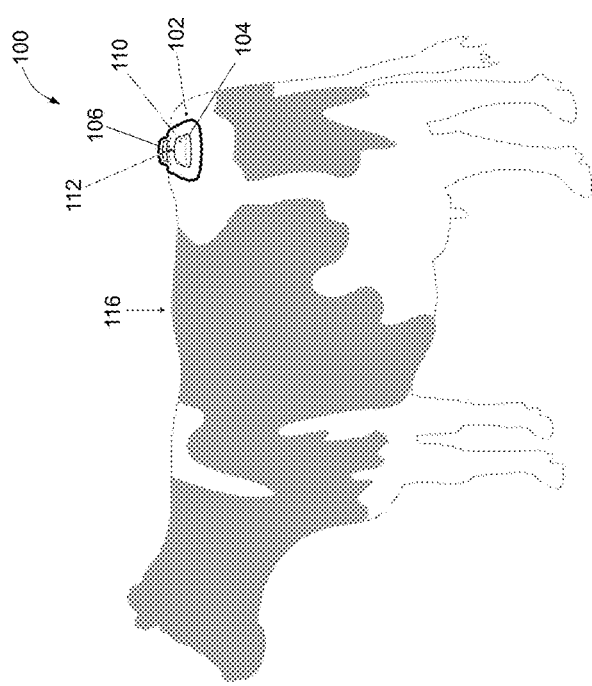
FIG. 1 is a side view of an exemplary sensor apparatus of the present disclosure mounted to an animal.

Turning now to FIGS. 1 and 2, side and rear views of an exemplary sensor apparatus 100 are provided. The sensor apparatus 100 includes a housing 102 including one or more interior cavities 104, 106, 108 formed therein. Components of a sensor assembly, e.g., sensor elements 110, 112, 114 can be disposed within the housing 102. For example, the sensor element 110 can be positioned within the interior cavity 104, the sensor element 112 can be positioned within the interior cavity 106, and the sensor element 108 can be positioned within the interior cavity 108. Although illustrated with three interior cavities 104, 106, 108, in some embodiments, the housing 102 can include, e.g., one, two three, four, five, and the like interior cavities. Thus, for example, one or more sensor elements 110, 112, 114 can be disposed within a single interior cavity configured and dimensioned to receive the respective sensor elements 110, 112, 114.

As shown in FIGS. 1 and 2, the sensor apparatus 100 can be mounted on an animal 116, e.g., a livestock animal. For example, the sensor apparatus 100 can be mounted on the hindquarters of the animal 116 to detect the reproductive status of the animal 116. The housing 102 can be formed from one or more flexible sheets to define a flexible enclosure. Thus, a bottom or mounting surface of the housing 102 can be formed to follow the contour of the mounting surface of the animal 116. In some embodiments, the housing 102 can include a resiliently deformable material which defines a profile complementary to the mounting surface of the animal 116. For example, the resiliently deformable material can be pre-formed to define a profile complementary to the preferred mounting surface of the animal 116 such that a user can accurately position the sensor apparatus 100 in a location that provides the most accurate results. In some embodiments, the profile of the mounting surface of the animal 116 can be scanned to create a three-dimensional resiliently deformable material with a profile complementary to the mounting surface of the animal 116. For example, the resiliently deformable material can define a substantially concave mounting surface. In some embodiments, rather than a centrally positioned concave portion and side flaps, the concave portion can be off-center.

Figure 3:
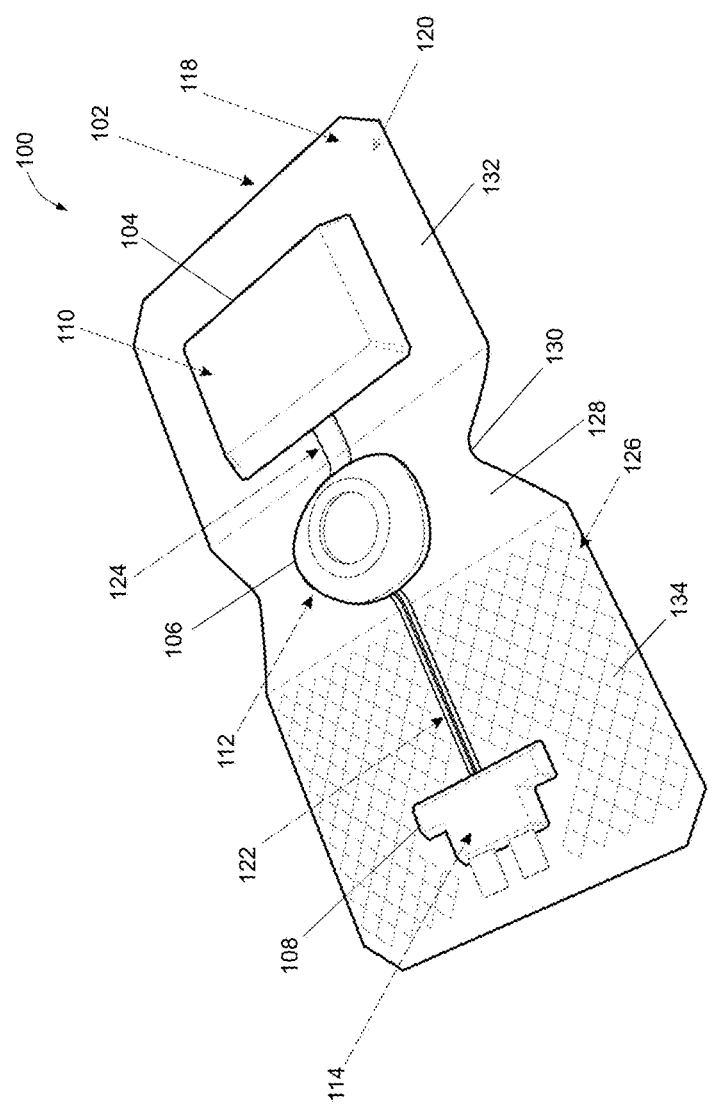
FIG. 3 is a perspective view of the exemplary sensor apparatus of FIG. 1.

FIG. 3 shows a perspective view of the sensor apparatus 100. As can be seen from FIG. 3, the sensor apparatus 100 is arranged to locate or include one or more components of a sensor assembly, e.g., elements 110, 112, 114. The elements 110, 112, 114 can be disposed inside one or more internal cavities 104, 106, 108 defined by the flexible enclosure of the housing 102. In some embodiments, the element 110 can be a processing device or unit, the element 112 can be an arrangement of a force or sensor transducer unit and an accelerometer, and the element 114 can be a power source, a power charging element, or both. In some embodiments, the element 112 can be, e.g., a formed by a combination of a force sensor or a pressure sensor, and an accelerometer. Thus, the element 112 can sense a force and acceleration imparted on the animal 116 during mounting. For example, when the animal 116 is in heat and is mounted by other animals 116, the element 112 can detect the acceleration, force and duration of application of the force during mounting. The accelerometer can detect the magnitude or speed of motion and the duration of motion of the animal 116 to determine when the motion is agitated or increased, representing the animal 116 in heat.

The housing 102 can include an upper layer 118, e.g., a first flexible sheet, which is sealed over a bottom layer 120, e.g., a second flexible sheet, to enclose the components of the sensor assembly. In some embodiments, the upper layer 118, e.g., the upper surface of the housing 102, can be a transparent surface through which light can be transmitted, through which the sensor assembly can be seen, or both. In some embodiments, the bottom layer 120 can represent the mounting surface of the housing 102. The upper and bottom layers 118, 120 can be bonded and sealed together along perimeter lines or portions of the internal cavities 104, 106, 108 where the upper and bottom layers 118, 120 meet.

Electrical connection elements 122, 124 shown in FIG. 3 enable various elements 110, 112, 114 to perform and communicate relative to each other within the housing 102. In some embodiments, an imprint structure 126, e.g., a diamond pattern, can be formed into one or more layers of the housing 102 to assist in positioning the sensor apparatus 100 relative to the animal 116. However, it should be understood that alternative geometries can be used for the imprint structure 126.

The housing 102 can define a substantially rectangular configuration. In some embodiments, a central portion 128 of the housing 102 can include V-shaped cut-outs 130 on opposing sides of the housing 102. The cut-outs 130 can assist in positioning and conforming the housing 102 to the profile of the animal 116. For example, the cut-outs 130 can reduce wrinkles or folds in the housing 102 during application onto the animal 116. The sensor elements 110, 112, 114 can be distributed within the housing 102 to assist in balancing the sensor apparatus 100 on the animal 116. For example, in some embodiments, the sensor element 110 can be positioned in an internal cavity 104 of a first flap 132, e.g., a first wing, the sensor element 112 can be positioned in an internal cavity 106 of the central portion 128, and the sensor element 114 can be positioned in an internal cavity 108 of a second flap 134, e.g., a second wing. The first and second flaps 132, 134 can extend in opposing directions away from the central portion 128 such that when the sensor apparatus 100 is positioned on the animal 116, the first and second flaps 132, 134 can maintain a substantially even weight distribution on either side of the central portion 128.

Figure 4:
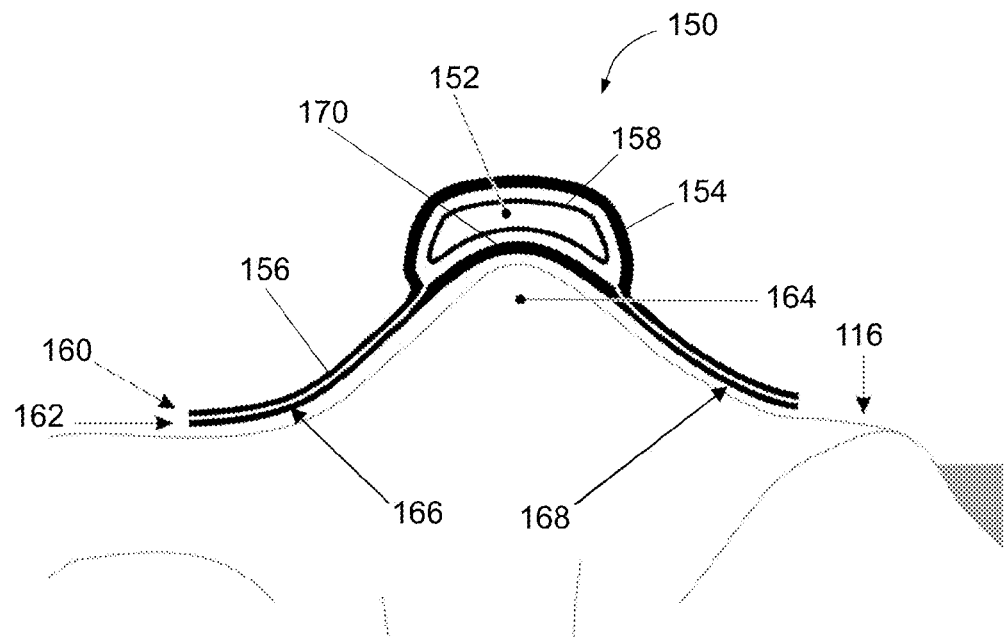
FIG. 4 is a cross-sectional rear view of an exemplary sensor apparatus of the present disclosure.

FIG. 4 shows a cross-sectional rear view of a sensor apparatus 150. The sensor apparatus 150 can be substantially similar in structure and function to the sensor apparatus 100 described above, except for the distinctions noted herein. In some embodiments, sensor elements of a sensor assembly 152 can be located in one place within a single internal cavity 154 provided in the housing 156. The sensor assembly 152 can be positioned on an animal 116. In some embodiments, an integrated, sealed sensor package 158 can be arranged between an upper layer 160 forming a visible surface and a bottom layer 162 forming a mounting surface of the housing 156. The upper layer 160 can therefore be visible or accessible when the sensor apparatus 150 is attached to the animal 116 and the bottom layer 162 can be positioned against the animal 116 for attachment thereto. The housing 156 can provide a flexible enclosure for the sensor assembly 152. The profile of the enclosure can conform and follow the contour 164 of the animal 116 spine once positioned and affixed appropriately to the animal 116.

The bottom layer 162, e.g., the mounting surface, can define a complementary profile which is arranged to assist alignment of the sensor apparatus 150 within approximately 100 mm from the proximal end of the tail of the animal 116. The flexible nature of the materials used to form the sensor apparatus 150 can allow the first and second side flaps 166, 168, e.g., wings, to extend laterally from the spine of the animal 116 and attach to the surface above the pelvic bone at a central portion 170 of the housing 156.

Figure 5:
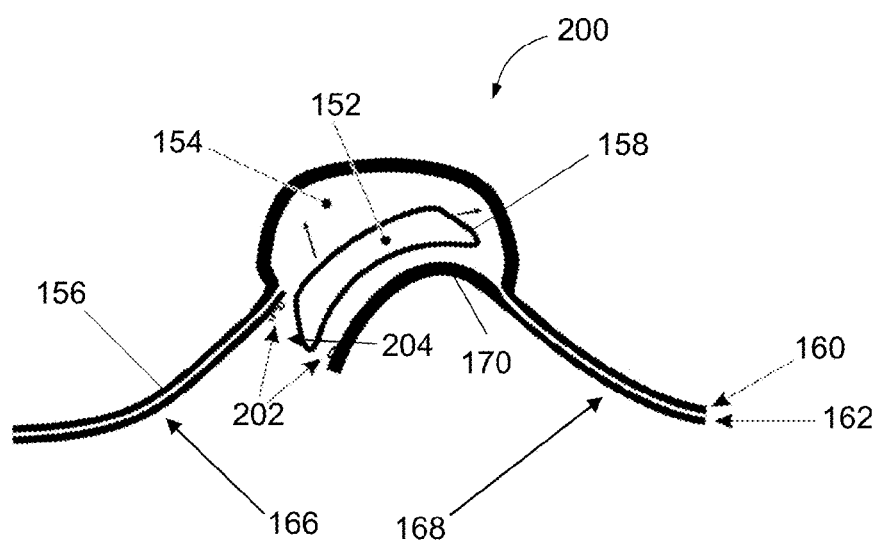
FIG. 5 is a cross-sectional rear view of an exemplary sensor apparatus according to the present disclosure including a retention mechanism.

FIG. 5 shows a cross-sectional rear view of a sensor apparatus 200. The sensor apparatus 200 can be substantially similar in structure and function to the sensor apparatus 150 described above, except for the distinctions noted herein. In particular, although the sensor apparatus 200 also includes an internal cavity 154 for housing a sensor assembly 152, the components of the sensor assembly 152 can be interchangeable through a retaining mechanism 202.

The retaining mechanism 202 can be used to hold or encase the sensor assembly 152 within the internal cavity 154 by being operable between an engaged position and a disengaged position. The retaining mechanism 202 performs a mechanical function, sealing function, or both, and can be released and re-engaged on demand. As shown in FIG. 5, the profile of the upper and bottom layers 160, 162 of the housing 156 form part of the retention mechanism 202. In the embodiment of FIG. 5, the retention mechanism 202 is configured as a clasp. However, it should be understood that in some embodiments, the retention mechanism 202 can include alternative, single use or reusable elements. For example, in some embodiments, the retention mechanism can be in the form of a flexible sheet including adhesive thereon such that the flexible sheet can be positioned to cover an exposed interior cavity 154 of the housing 156 after a sensor assembly 152 has been positioned therein. The retention mechanism 202 can allow a portion of the bottom layer 162 to be engaged and disengaged from the upper layer 160 to form an opening 204 through which the sensor assembly 152 can be inserted or removed. Thus, the sensor assembly 152 can be interchanged or can be removed for repair. It should be understood that in the engaged position, the retention mechanism 202 can maintain the internal cavity 154 enclosed in a water-resistant manner.

Figures 6, 7:
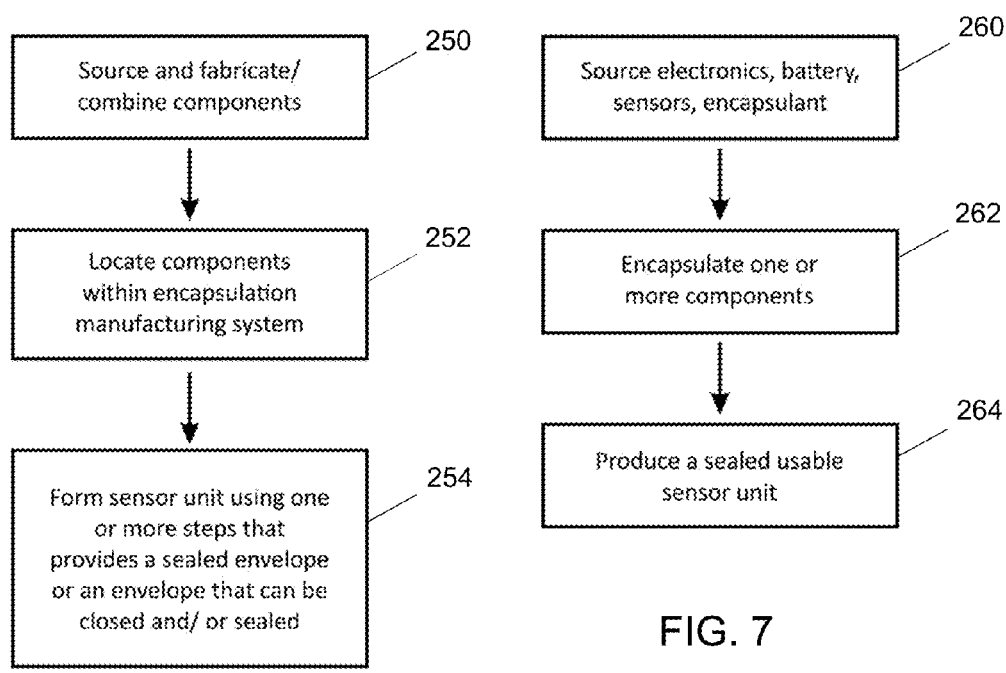
FIG. 6 is a flow chart of steps executed in manufacturing an exemplary sensor assembly according to the present disclosure.
FIG. 7 is a flow chart of steps executed in manufacturing an exemplary sensor assembly according to the present disclosure.

FIGS. 6 and 7 show flow charts of steps executed in two methods of manufacturing a sensor apparatus. In particular, FIG. 6 outlines the steps involved with a method of manufacture which laminates together upper and lower layers, e.g., flexible sheet materials, to contain components of a sensor assembly. In some embodiments, the upper and lower layers can be bonded together over the majority of the intersecting perimeter while initially leaving a small gap for the subsequent insertion of sensor elements of the sensor assembly. The gap can be sealed closed after the insertion of the sensor assembly elements.

Thus, the components for the sensor assembly can be sourced and fabricated or combined (step 250). The components can be located within an encapsulation manufacturing system (step 252). A form sensor unit using one or more steps can provide a sealed envelope (e.g., a housing) or an envelope that can be closed or sealed (step 254). The sensor assembly can be inserted into the fabricated housing and the housing can be sealed to maintain the sensor assembly in a water-resistant environment.

FIG. 7 shows an alternative method where various elements of the sensor assembly are encapsulated during a manufacturing process, thereby forming the entire flexible enclosure for the sensor apparatus. In some embodiments, molding techniques can be used to concurrently form the housing of the sensor apparatus and assembly the elements of the sensor assembly. For example, elements of the sensor assembly can be formed integrally inside the housing while the housing is being formed by the molding process. Sensor apparatus components, e.g., source electronics, a battery, sensors, an encapsulant, and the like, can be provided (step 260). One or more sensor apparatus components can be encapsulated (step 262). A sealed and usable sensor apparatus can thereby be produced (step 264).

Figure 8:
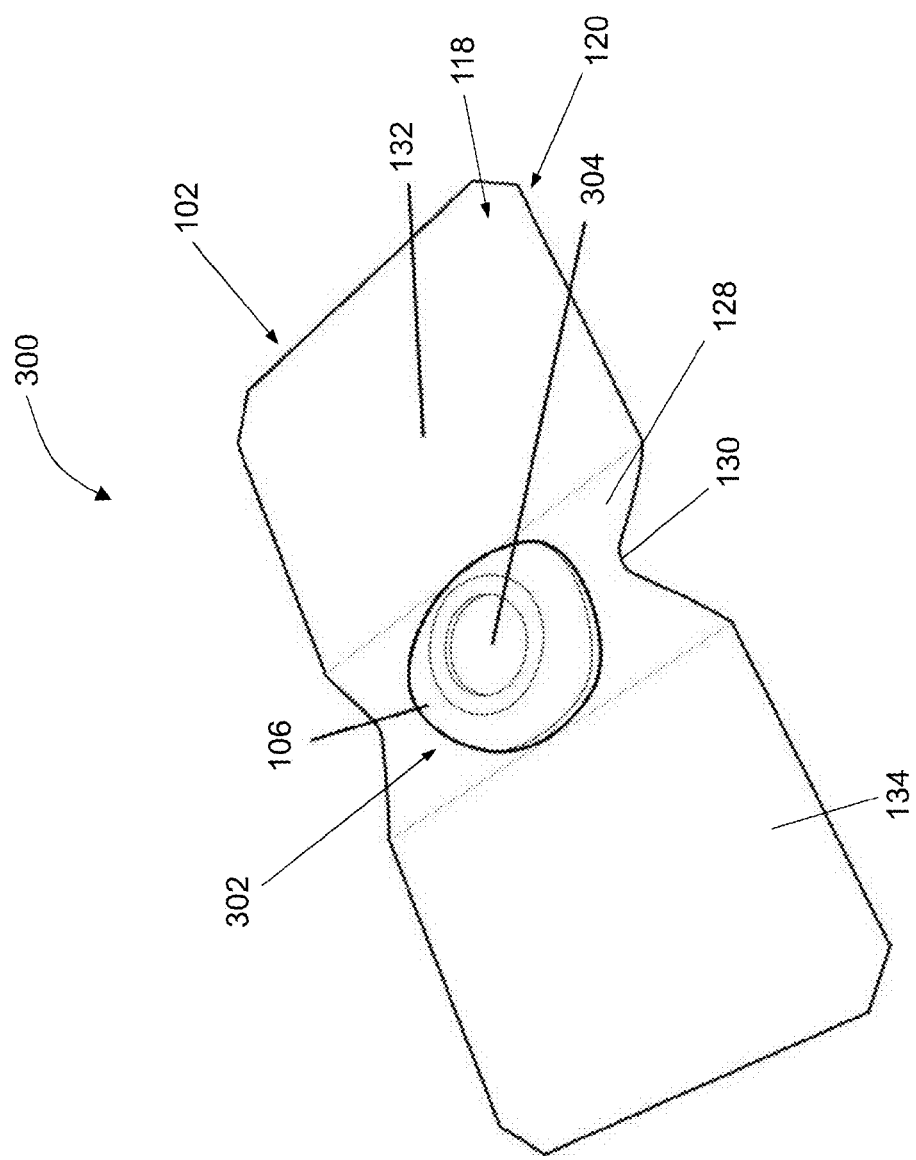
FIG. 8 is a perspective view of an exemplary sensor apparatus according to the present disclosure.

FIG. 8 shows a perspective view of an alternative sensor apparatus 300. The sensor apparatus 300 can be substantially similar in structure and function to the sensor apparatuses described above, except for the distinctions noted herein. Therefore, like features are shown with like reference numbers. The sensor apparatus 300 can include a sensor assembly 302 including one or more elements 304. The sensor assembly 302 can combine one or more sensor elements or units and one or more transmitter units. In particular, the sensor element and transmitter unit can be contained within an internal cavity 106 of the housing 102. The housing 102 can be attached to an animal, e.g., a cow, to determine a physiological or reproductive state of the animal. The sensor assembly 302 can include a force or pressure sensitive sensor as one of the elements 304 for sensing force applied externally to the housing 102 and, therefore, the animal. In some embodiments, the sensor assembly 302 can include a force or pressure sensitive sensor and an accelerometer as the elements 304.

Figure 9:
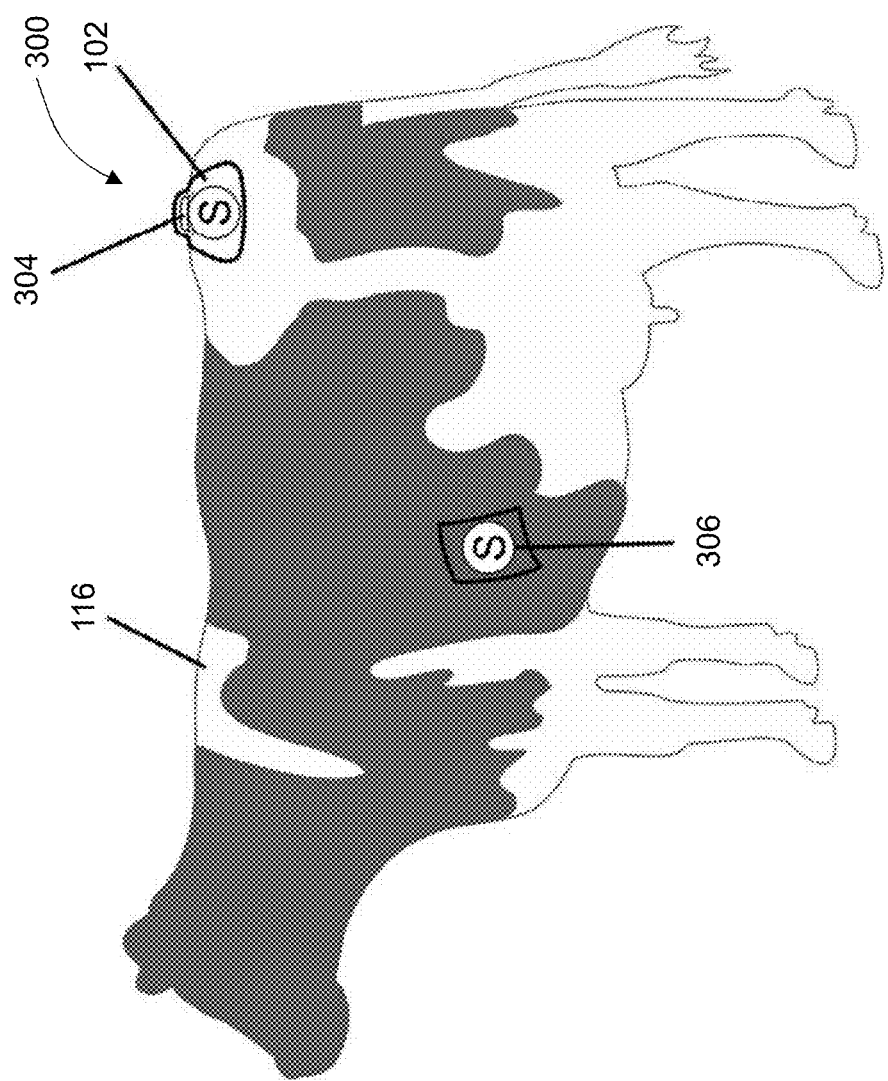
FIG. 9 is a side view of the exemplary sensor apparatus of FIG. 8 mounted to an animal.

FIG. 9 shows a side view of a sensor apparatus 300 including a sensor and transmitter unit mounted to an animal 116. In order to detect mounting activity, force, acceleration, combinations thereof, and the like, the elements 304 contained within and affixed using the housing 102 can be located proximal to the rear tail region of the animal 116. In some embodiments, one or more additional sensor units, transmitter unit 306, or both, can be placed or implanted within the animal 116 to garner further information related to the physiological state of the animal.

Figure 10:
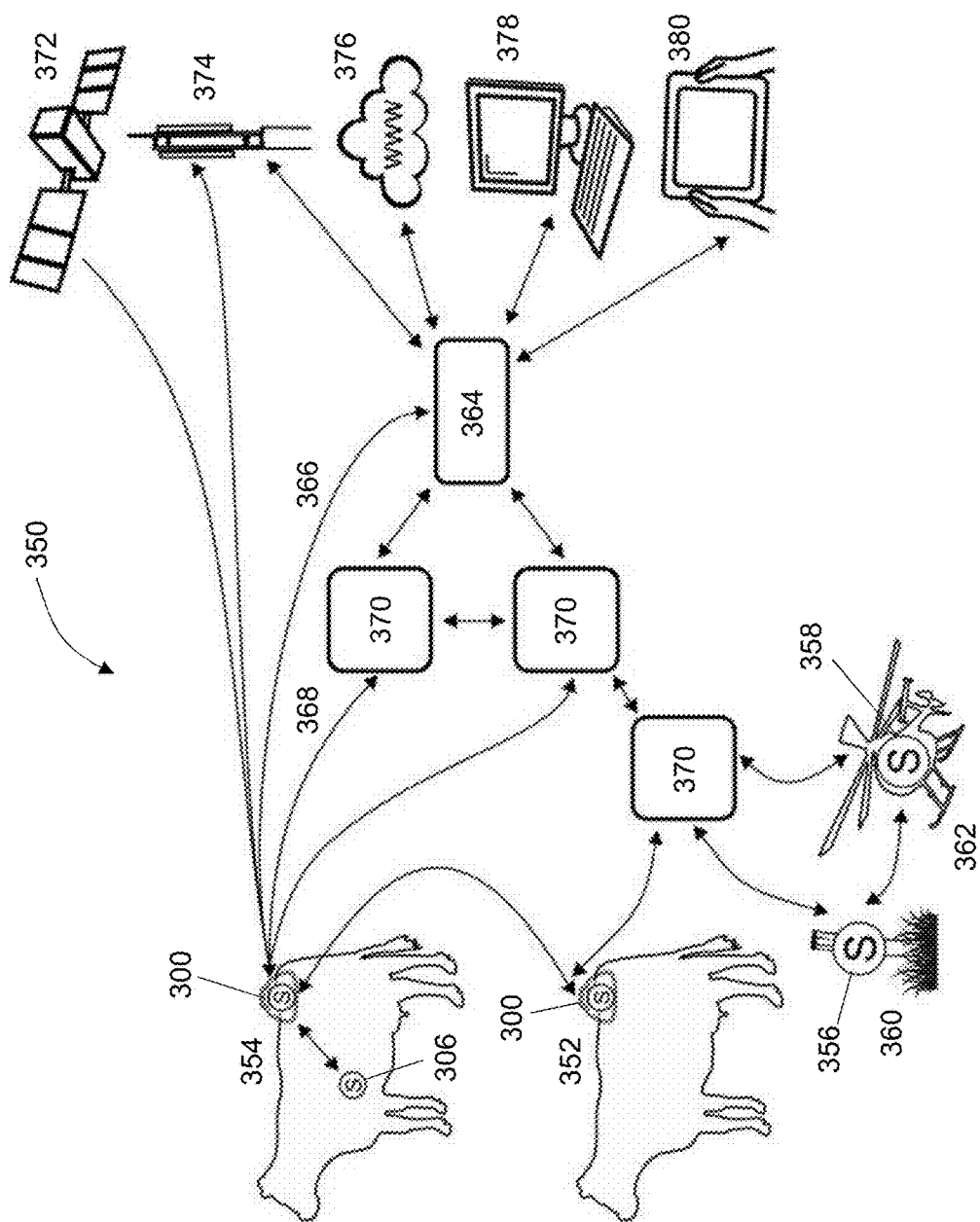
FIG. 10 is a block diagram of an exemplary sensor apparatus and transmitter unit network according to the present disclosure.

FIG. 10 shows a block diagram of an exemplary communication network 350 between sensor units, transmitter units and other elements of the disclosed sensor system. One or more sensor apparatuses 300, e.g., sensor and transmitter units, can be located or positioned on one or more animals 352, 354 (e.g., in a singular manner as with animal 352 or a multiplicative manner as with animal 354). Sensor units 356, 358 can be located on stationary platforms 360, e.g., posts or building structures in a field, and moving conveyances 358, e.g., vehicles, airplanes, helicopters, and the like, to enable sensor apparatus 300 information related to the physiological state of the animals 352, 354, for other farm management reasons, or both, to be gathered and transmitted. Communication between sensor apparatuses 300, e.g., sensor elements, transmitter units, and the like, can occur through wireless or wired connections. Distributed communication to a central processor 364 can be achieved through direct communication paths 366 or indirect communication paths 368 via one or more layers of further transmitter units 370. For example, intermediate transmitter units 370 can be positioned on animals 352, 354, on stationary platforms 360, on moving conveyances 358, and combinations thereof to transmit data from the sensor apparatuses 300 to the central processor 364.

In some embodiments, an RFID reader (not shown) (e.g., an RFID reader from LightningROD™ available from www.id-ology.com) can be used as a form of sensor unit. Communication mechanisms such as terrestrial satellites 372, communication towers 374, the internet or cloud-based tools 376, or both, computers 378, mobile devices 380, and combinations thereof, can be used to interact with or act as a further processor. Through the communication network 350 of sensor units, transmitter units, and processors, data can be gathered, processed, stored and acted upon for the benefit of farm and animal management decisions.

Figure 11:
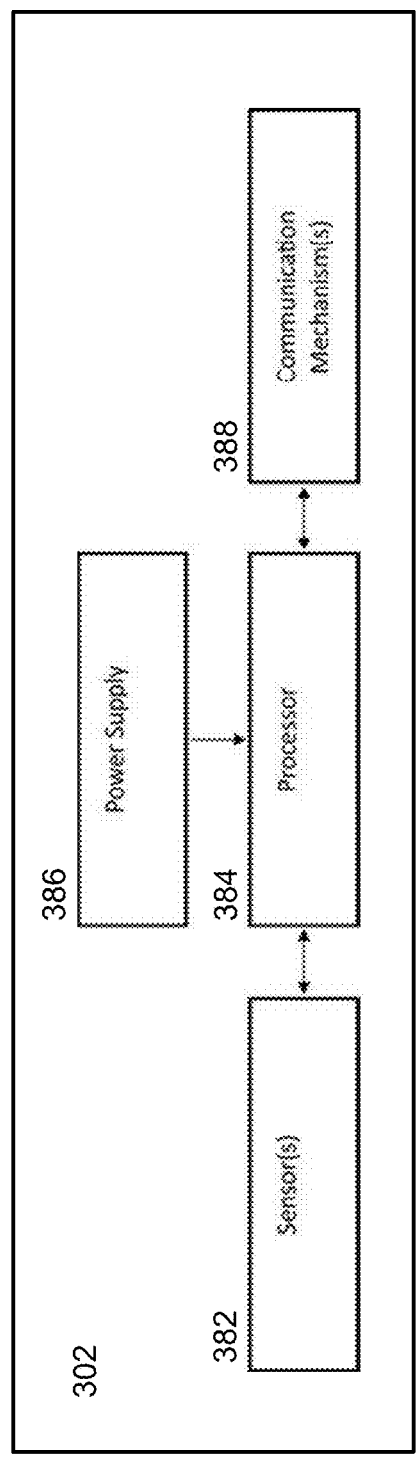
FIG. 11 is a block diagram of an exemplary sensor and transmitter apparatus according to the present disclosure.
Figure 12:
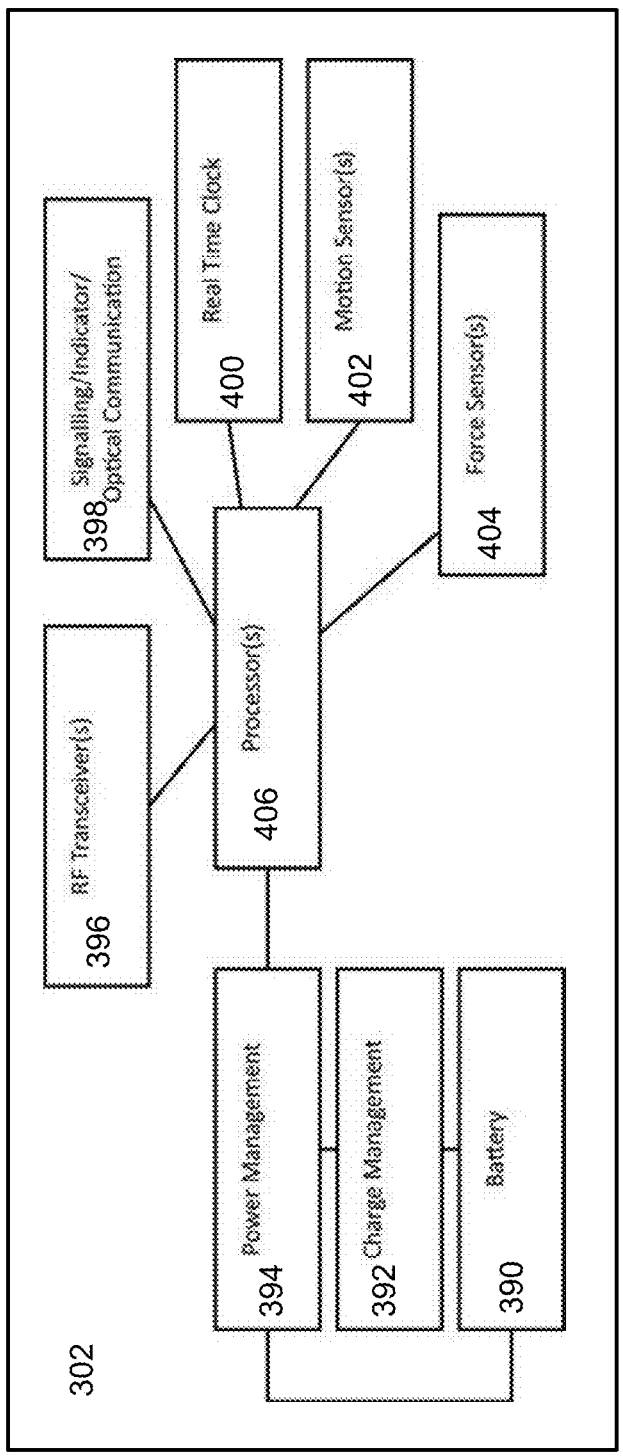
FIG. 12 is a block diagram of an exemplary sensor and transmitter apparatus according to the present disclosure.
Figure 13:
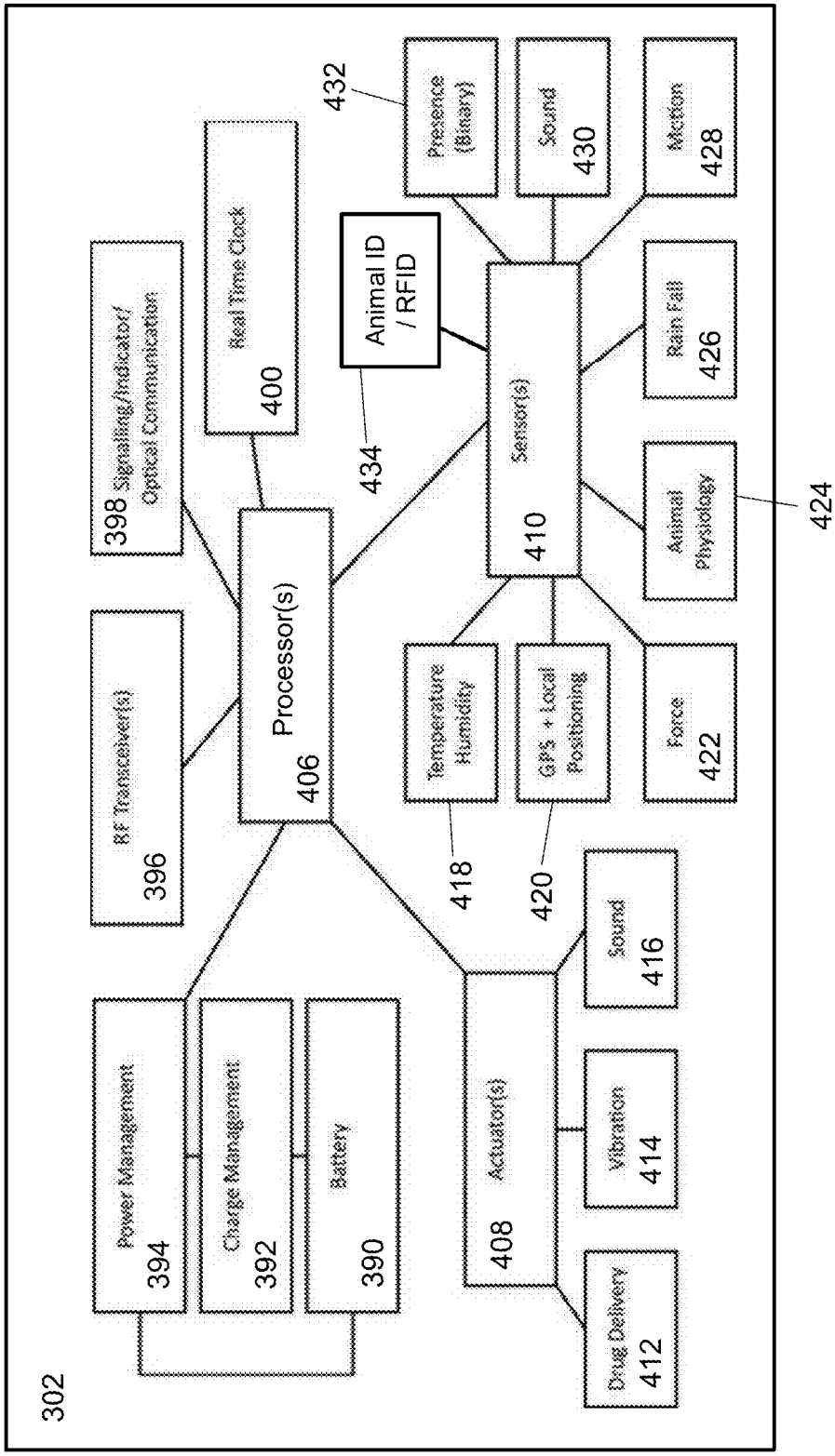
FIG. 13 is a block diagram of an exemplary sensor and transmitter apparatus according to the present disclosure.

FIGS. 11-13 show block diagrams of various implementations of a sensor assembly 302 including sensor and transmitter units as used by the sensor apparatus 300. As shown in FIG. 11, in some embodiments, the sensor assembly 302 can include a number of sensors 382 in communication with a processor 384 that communicates with a power supply 386 to enable operation of the processor 384. The sensor assembly 302 can further include one or more transmitter unit communication mechanisms 388 to relay information to a human, machine, or both. The sensors 382 can be, e.g., one or more force sensors, pressure sensors, proximity sensors, capacitance sensors, acceleration sensors, motion sensors, combinations thereof, and the like. Communication mechanism(s) 388 can includes a light source, a radio frequency source, or both.

As shown in FIG. 12, in some embodiments, the sensor assembly 302 can include a module that includes a battery 390, charge management 392, and power management 394 circuitry to enable recharging, to extend the operating lifetime, or both, of the sensor assembly 302, including the associated transmitter unit for a given battery or charge level. One or more radio frequency transceivers 396 can be used to enable wireless communication with external devices, such as additional or intermediate transmitter units, processors, or both. In some embodiments, the sensor assembly 302 can include a suitable signaling or optical communication means 398 which can be used to indicate to observers, transmitters, processors, associated devices, combinations thereof, and the like, the status of the sensor assembly 302 and any data associated with the sensor assembly 302. In some embodiments, the sensor assembly 302 can include a real time clock 400, sensors that measure motion 402, force 404, other parameters, and the like. The sensor assembly 302 can include one or more processors 406 which can be used to manage communication, data capture, calibration, and overall operation of the sensor assembly 302 functions.

As shown in FIG. 13, in some embodiments, the sensor assembly 302 can include all or some of the elements shown in FIGS. 11 and 12, and can further include one or more actuators 408, sensors 410, or both, to enhance the capability and accuracy of the sensor assembly 302 measurements. In some embodiments, the actuators can be, e.g., drug delivery 412, vibration 414, sound 416, combinations thereof, and the like. In some embodiments, the sensors 410 can be, e.g., temperature, humidity 418, or both, GPS, local positioning 420, or both, force 422, animal physiology 424, rainfall 426, motion 428, sound 430, presence (e.g., binary) 432, animal identification (ID), RFID 434, or both, combinations thereof, and the like. In some embodiments, the GPS, local positioning 420, or both, can be used to locate the animal, the sensor apparatus 300, or both. In some embodiments, visual means, audio means, radio transmission means, combinations thereof, and the like, can be used to locate the animal, the sensor apparatus 300, or both.

Figure 14:
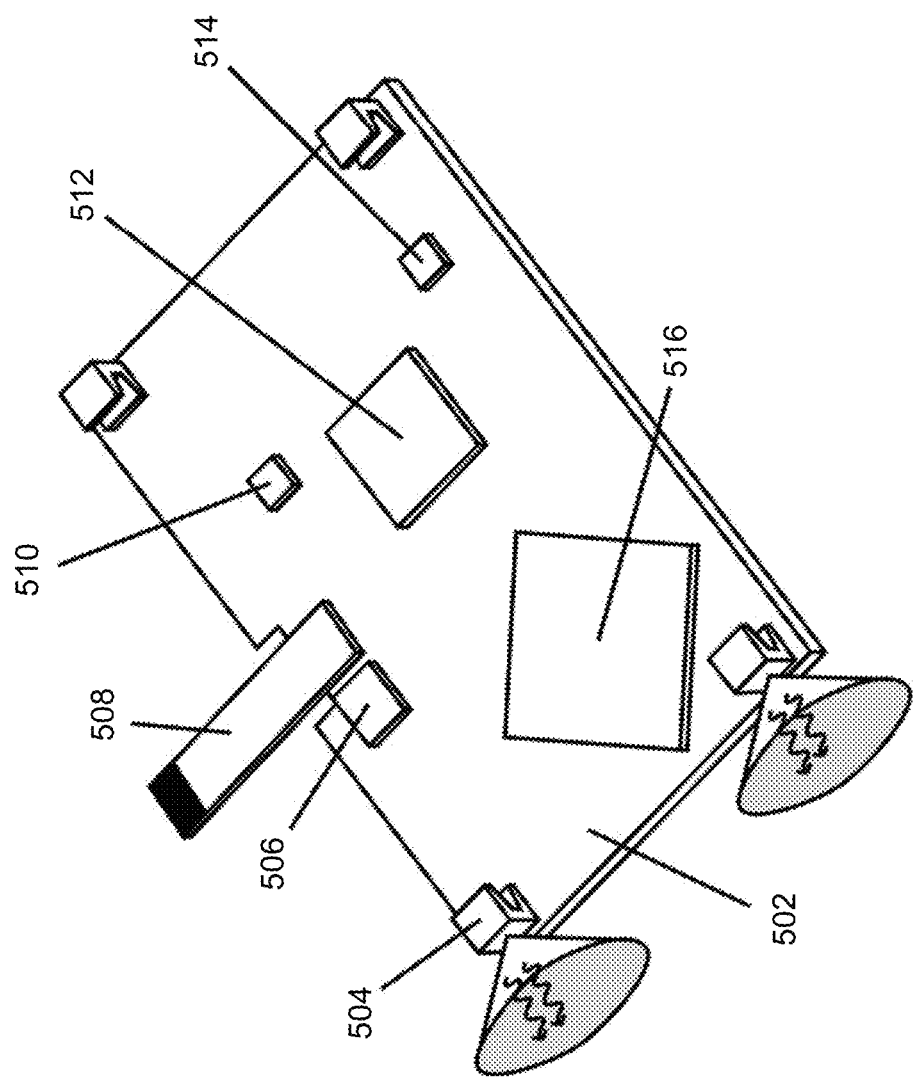
FIG. 14 is a perspective view of an exemplary circuit board layout of a sensor and transmitter apparatus according to the present disclosure.

FIG. 14 shows a diagrammatic view of an exemplary circuit board 500 layout of a sensor apparatus, e.g., a sensor and transmitter unit. The circuit board 500 can include a printed circuit board (PCB) 502 and one or more visual indicators 504 mounted and connected to the PCB 502 to provide status, communication, or both, related to the information detected or gathered. In some embodiments, the circuit board 500 can include a real time clock 506, a force sensor 508, a battery charge management component 510, a microcontroller 512, an accelerometer 514, a radio frequency transceiver 516, combinations thereof, and the like.

As discussed above, animals, e.g., livestock, can come on heat one time per month and particular behavioral differences can be detected during this time period. For example, when a cow is in heat, other cows can try to mount the cow in heat during a time period of approximately 24 hours to approximately 36 hours. It is preferable to inseminate the cow during this time period. When a cow is in a caged area, e.g., for milking, the cow can be separated from other cows and therefore cannot be mounted during the time in heat. However, the cow can indicate certain characteristics, such as agitated or increased movement, which show the change in the physiological state of the cow.

The sensor apparatuses discussed herein can detect the physiological state of the animal through sensors, e.g., a pressure sensor, an accelerometer, and the like. For example, the pressure sensor can measure the force or pressure applied and the duration of application of the force or pressure. As a further example, the accelerometer can measure the magnitude of the motion and the duration of motion of the animal. The detected or collected data can be transferred to a user, e.g., a farmer, in a readable format. Collected both force or pressure and accelerometer data, rather than only one, can advantageously provide more accurate data regarding the physiological state of the animal. Thus, force or pressure readings indicating that a cow is in heat can be supported by accelerometer data which shows agitated motion of the cow. Thus, insemination can occur during the appropriate time.

In some embodiments, the detected data can be transferred to a user or an electronic device through transmitters. For example, in a milking parlor, a sensor can be positioned in one or more locations such that as cows pass one or more points in the milking parlor each day, the detected data can be transmitted from the sensor apparatus. In some embodiments, visual indicators, audio indicators, or both, e.g., LED lights, radio communication, and the like, can be used to indicate that data has been collected or should be collected from the sensor apparatus. In embodiments where the cow is in a pasture, e.g., long distances from a structure, the detected data can be transmitted through intermediate transmitters.

Experimentation was performed starting Jul. 7, 2013 using eleven sensors apparatuses mounted onto animals which received prostaglandin (PG) treatment the same day. Nine sensor apparatuses configured as disclosed herein included force or pressure contact sensors, while two sensor apparatuses included a capacitance sensor concept. Motion was recorded in ten minute epochs. Data stored on the sensor apparatuses was collected twice daily using a transmitter at the top of an approximately 6 meter tall pole near a milking shed. All sensor apparatuses that remained on the animals were removed after six days, i.e., on Jul. 12, 2013. Normal farm practices were used to select the insemination times reported and data from the sensor apparatuses was not used to influence the insemination process.

The sensor disposition and insemination data from the animals in the trial is summarized in Table 1 below. Of the eleven sensor apparatuses deployed, five fell off the animal and were not recovered. The leading cause of sensor apparatuses coming off the animal was a weak area where a plastic film pulled in around the base of the electronics during vacuum forming. In each case, the plastic film remained glued to the animal for the duration of the trial. It should be understood that this issue can be resolved by, e.g., reducing shape corners in the electronics housing, using a thicker plastic film, adding fibers to the plastic film to increase strength, modifying the shape of the mold, electronics housing, or both, to prevent the plastic film from pulling in around the base of the housing, increasing the amount of adhesive, combinations thereof, and the like.

TABLE 1

Sensor Disposition and Insemination Timing Data

| Sensor ID | Animal ID | Type | Insemination | Disposition | Notes |
|---|---|---|---|---|---|
| 3 | 478 | FSR | July 12, AM | Recovered | Cracked housing |
| 4 | 328 | Cap | July 9, PM | Recovered | |
| 6 | 636 | FSR | July 9, PM | Lost | |
| 17 | 214 | FSR | July 10, PM | Recovered | |
| 27 | 520 | FSR | July 10, PM | Lost | |
| 19 | 369 | FSR | No | Recovered | |
| 21 | 111 | FSR | July 10, AM | Lost | |
| 22 | 579 | FSR | No | Recovered | |
| 24 | 26 | FSR | July 12, AM | Lost | |
| 26 | 418 | FSR | No | Recovered | |
| 23 | 299 | Cap | July 9, AM | Lost | Fell apart |

With respect to Table 1, Sensor ID represents a unique identification number for each sensor apparatus, Animal ID represents a unique identification number for each animal, Type represents the type of sensor apparatus (e.g., FSR is a force or pressure contact sensor and Cap is a capacitance sensor) a sensor ID, Insemination represents the date and time period of insemination if the animal was inseminated, Disposition represents whether the sensor apparatus was recovered, and Notes represents additional notes with respect to specific sensor apparatuses. During experimentation, the film around sensor 3 tore away from the housing. However, it was not clear whether the tear began around the base of the electronics housing (e.g., suggesting a weak point in the vacuum forming was the cause) or whether the film failed in a different way. Based on prior experience, it is believed that the tear began around the base of the electronics housing.

Figure 15:
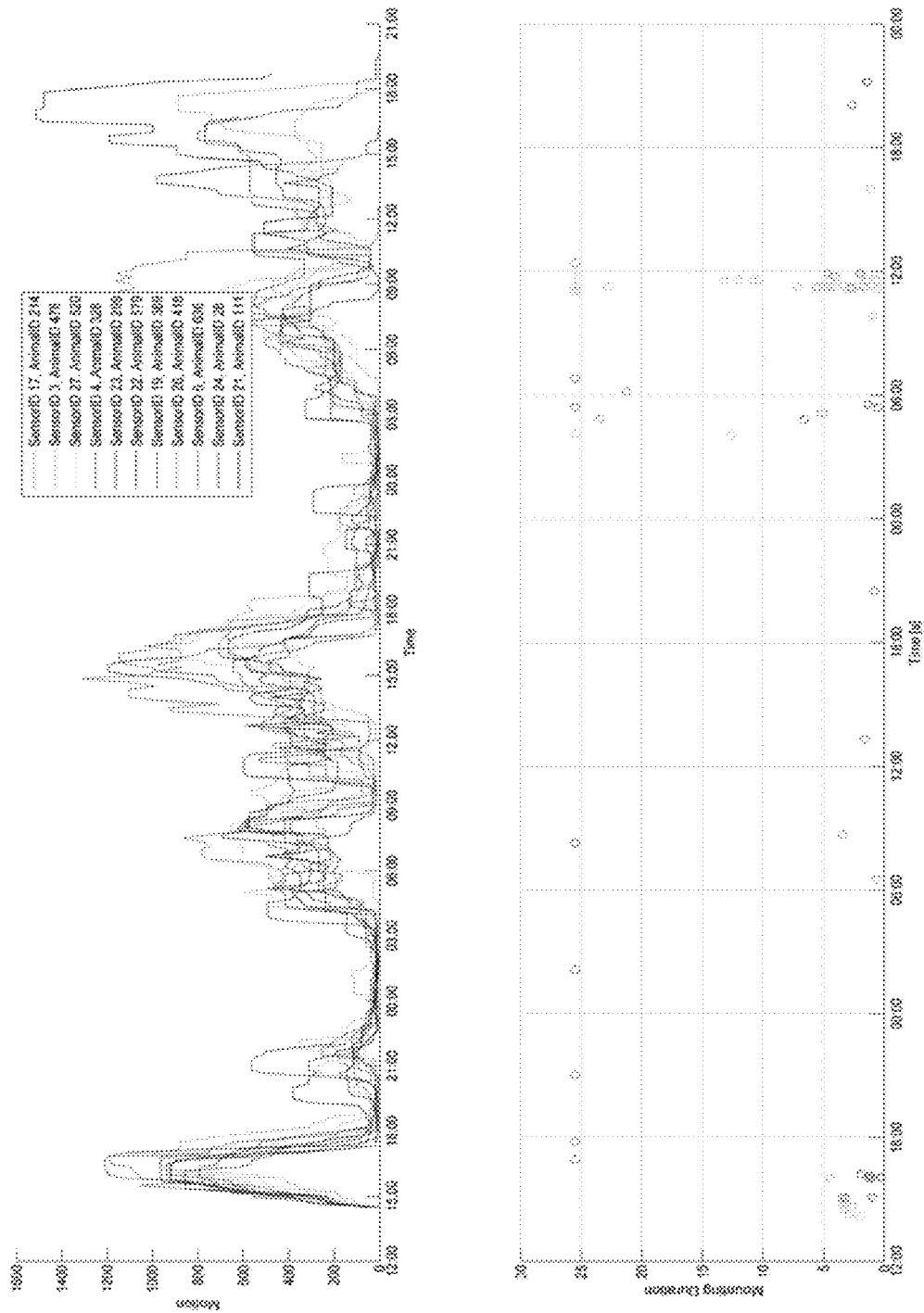
FIG. 15 is a graph showing motion data and contact sensor data for experimental results of an exemplary sensor apparatus.

The motion and contact sensor data collected from the eleven animals over the first two days is plotted in FIG. 15. In particular, FIG. 15 is a graph of motion data (top) and contact sensor data (bottom) recorded for all sensor apparatuses. A 300 minute wide median filter was applied to smooth the motion data. As was expected, both motion and contact sensor activity is greater during the day, while the animals remain largely inactive between midnight and 3:00 AM.

Figure 16:
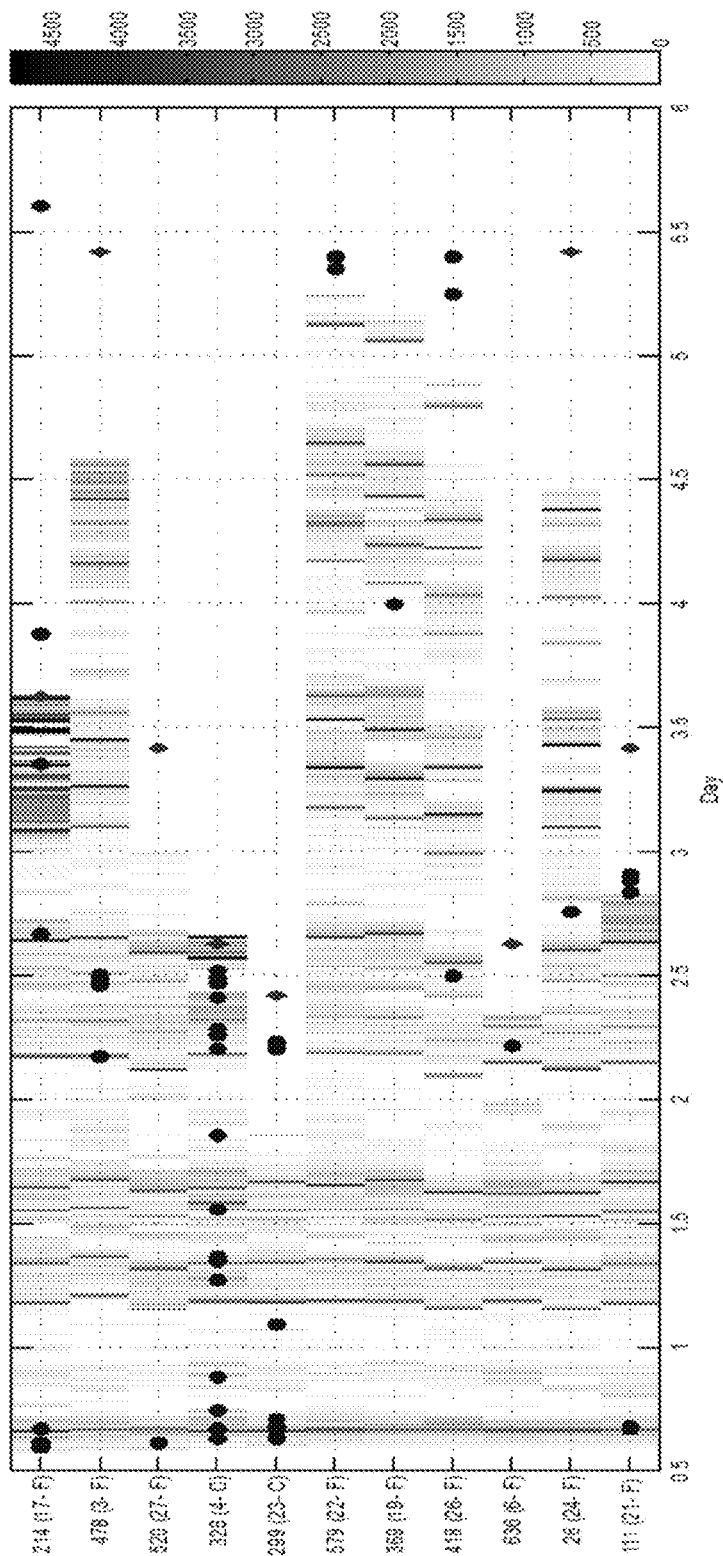
FIG. 16 is a graph showing unfiltered motion data, contact sensor data, and approximate timing of artificial insemination for experimental results of an exemplary sensor apparatus.

FIG. 16 is a graph of the motion and contact measurements combined. In particular, the motion data is shown in bands of gray, the contact sensor data or contact events is shown as dots, and the diamonds indicate approximate timing of artificial insemination. The y-axis represents the Animal ID, the x-axis represents the day, and the scale on the right represents motion data with greater activity indicated by a darker shade. The approximate timing of insemination is indicated at 10:00 AM for morning treatment or 3:00 PM for afternoon treatment. Motion data from each 10 minute epoch is indicated by a shaded vertical line with greater activity indicated by a darker shade. However, the shading is based on absolute motion across all animals, not relative to each animal's individual motion. Time is measured relative to midnight on July $7^{th}$, the day the sensor apparatuses were attached to the animals.

The short burst of activity at the start of measurements is likely associated with attachment of the sensor apparatuses to the animals. The short bursts of activity at 4:00 AM, most clear on day 1 may indicate the animals arriving for milking, while the activity at 8:00 AM and 3:00 PM, again clearest on day 1, may be morning and afternoon milking, respectively. Although there is no band around 1:00 PM when animals were expected to be arriving for afternoon milking, this may be due to a shorter walking distance.

Figure 17:
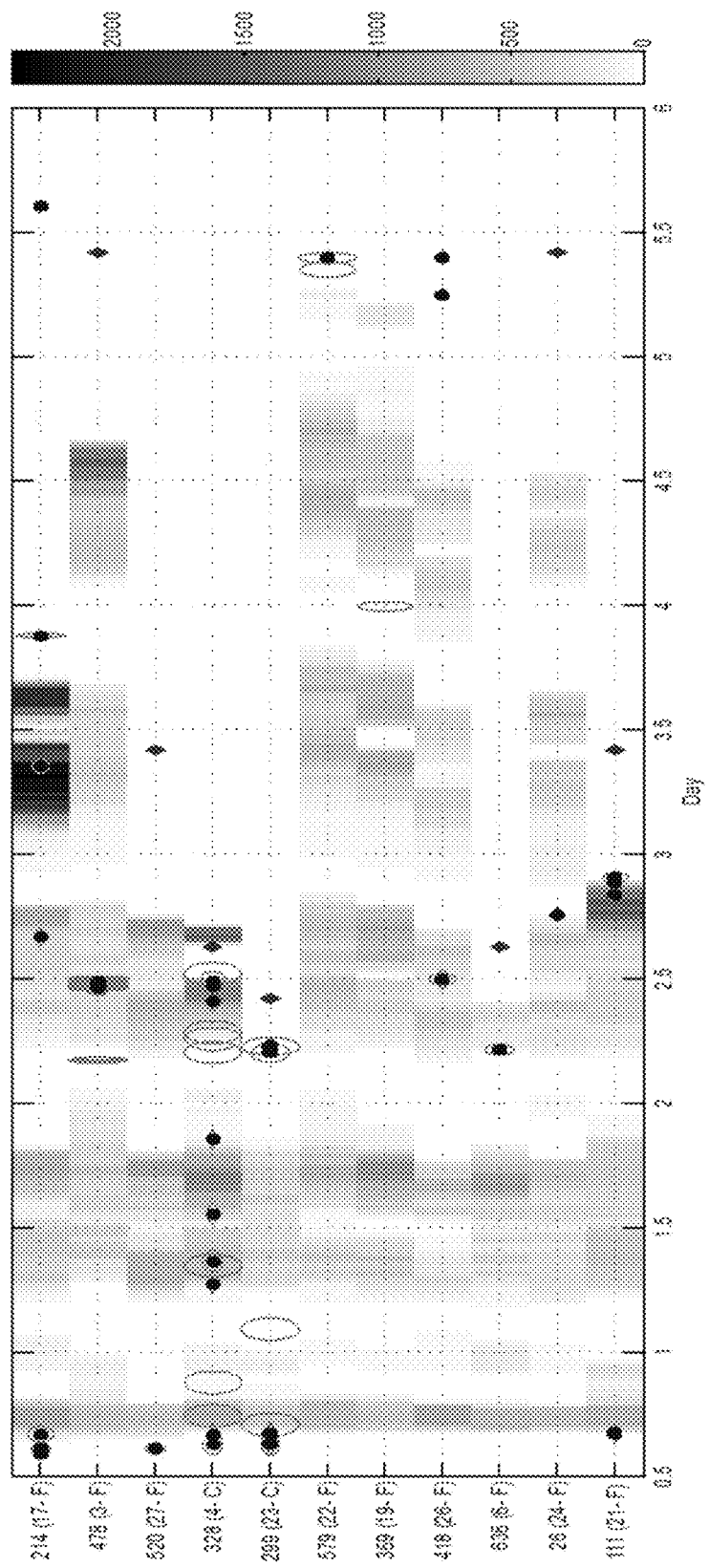
FIG. 17 is a graph showing filtered motion data, contact sensor data, and approximate timing of artificial insemination for experimental results of an exemplary sensor apparatus.

In FIG. 17, a median filter (21 epochs, approximately 3.5 hours) was applied to the motion data to emphasize more sustained activity. In FIG. 17, contact measurements are marked with rings and solid dots, motion data is indicated by bands of gray, and approximate timing of insemination is indicated by diamonds. The height of each ring is proportional to the contact duration (up to 10 seconds) while the width of each ring is proportional to the contact force. A solid dot is only shown for contacts less than 8 seconds. The y-axis represents the Animal ID, the x-axis represents the day, and the scale on the right represents motion data with greater activity indicated by a darker shade.

When an animal comes on heat, it is expected to see both increased motion activity and activation of the contact sensor from mounting. For example, studies have reported an increase in pedometry of more than 200% for cows on pasture. (See, e.g., Nebel, R. L. et al., *Automated electronic systems for the detection of oestrus and timing of AI in cattle*, Animal Reproduction Science, 60-61, pp. 713-723 (2000)). In a study using the HeatWatch® system, an average of 13.6 mounts (standard error 1.52) on one herd of 48 animals and 8.5 mounts (standard error 0.81) on a second herd of 41 animals was reported. (See, e.g., Xu, Z. Z. et al., *Estrus detection using radiotelemetry of visual observation and tail painting for dairy cows on pasture*, Journal of Dairy Science, 81, pp. 2890-2896 (1998)). However, in both cases, only two mounting events were recorded for at least one animal.

Animal ID 214 shows the most significant increase in motion activity immediately preceding insemination, reaching more than three times the highest activity in the monitored period. However, only two contact events were recorded in the day preceding insemination. This is at the lowest end of the range the study by Xu. (See, e.g., Xu, Z. Z. et al., *Estrus detection using radiotelemetry of visual observation and tail painting for dairy cows on pasture*, Journal of Dairy Science, 81, pp. 2890-2896 (1998)).

Animal ID 111 also shows a more than three-fold increase in motion and three contact events in the afternoon preceding insemination. Although the sensor apparatus stopped transmitting data shortly after 11:00 PM and was lost, the motion data immediately following the last contact measurement at 9:40 PM was zero. This may suggest the sensor apparatus was dislodged by genuine mounting behavior rather than tail flicks or head rubbing.

The sensor apparatus on Animal ID 478 was lost just under a day before insemination. However, the sensor apparatus showed an approximately 2.7 fold increase in motion activity just before it was dislodged. However, the bulk of contact activity was about 3 days before insemination and 2 days before motion activity began to increase. At that point, between 11:00 AM and 12:00 PM on July 9$^{th}$, 33 contact events were recorded, two-thirds of them between 0 and 8 seconds (e.g., an average of 3.3 seconds). Thus, although Animal ID 478 showed a large amount of activity which indicates that the animal was in heat, the animal was not inseminated until approximately day 5.5. By utilizing the data from the sensor apparatus, a user could have determined that the animal was in heat much earlier, e.g., by day 1.5 or 2.5, and could have inseminated the animal at a more appropriate time.

Animal ID 328 showed the greatest level of motion activity around the time of insemination. However, the motion activity was only 30% higher (e.g., median 1300 motion events/epoch) than motion activity seen a few hours earlier and in the afternoon of the preceding day. Thus, although Animal ID 328 showed a large amount of activity which indicates that the animal was in heat, the animal was not inseminated until approximately day 2.5. By utilizing the data from the sensor apparatus, a user could have determined that the animal was in heat much earlier, e.g., by day 1.5, and could have inseminated the animal at a more appropriate time.

The baseline motion activity for the other animals was approximately 500 motion events/epoch. Therefore, it is possible that an appropriate baseline was not defined. Three contact events between 0 and 8 seconds long were seen in the morning preceding insemination while a total of 7 contact events were seen in the preceding 24 hour period. A prototype capacitance sensor was used for detecting contact events on Animal ID 328 and, therefore, the results of Animal ID 328 may differ from the data collected by the force or pressure contact sensors.

No clear increase in activity was seen for Animal ID 520. In addition, no contact events were recorded for this animal. However, this animal was inseminated approximately 18 hours after the last data was received.

Animal IDs 579, 369 and 418 were not inseminated. However, during experimentation, a farm manager suggested that Animal ID 369 would normally be inseminated in other circumstances. Sensor apparatuses on Animal IDs 369 and 418 showed one contact event each before being removed and some variation in motion. However, the three animals did not show large motion changes observed by the sensor apparatuses.

Animal ID 636 was inseminated and showed a single contact event in the morning before an afternoon insemination. However, there was not a clear increase in motion activity from this animal either. A similar situation occurred for Animal ID 26, although the last motion data was received nearly a day before insemination. Although Animal ID 299 was inseminated approximately 12 hours after the last motion data was received, the data showed no sign of increased activity. However, it should be noted that this sensor apparatus came apart during experimentation and it is unclear which data is valid.

Figure 18:
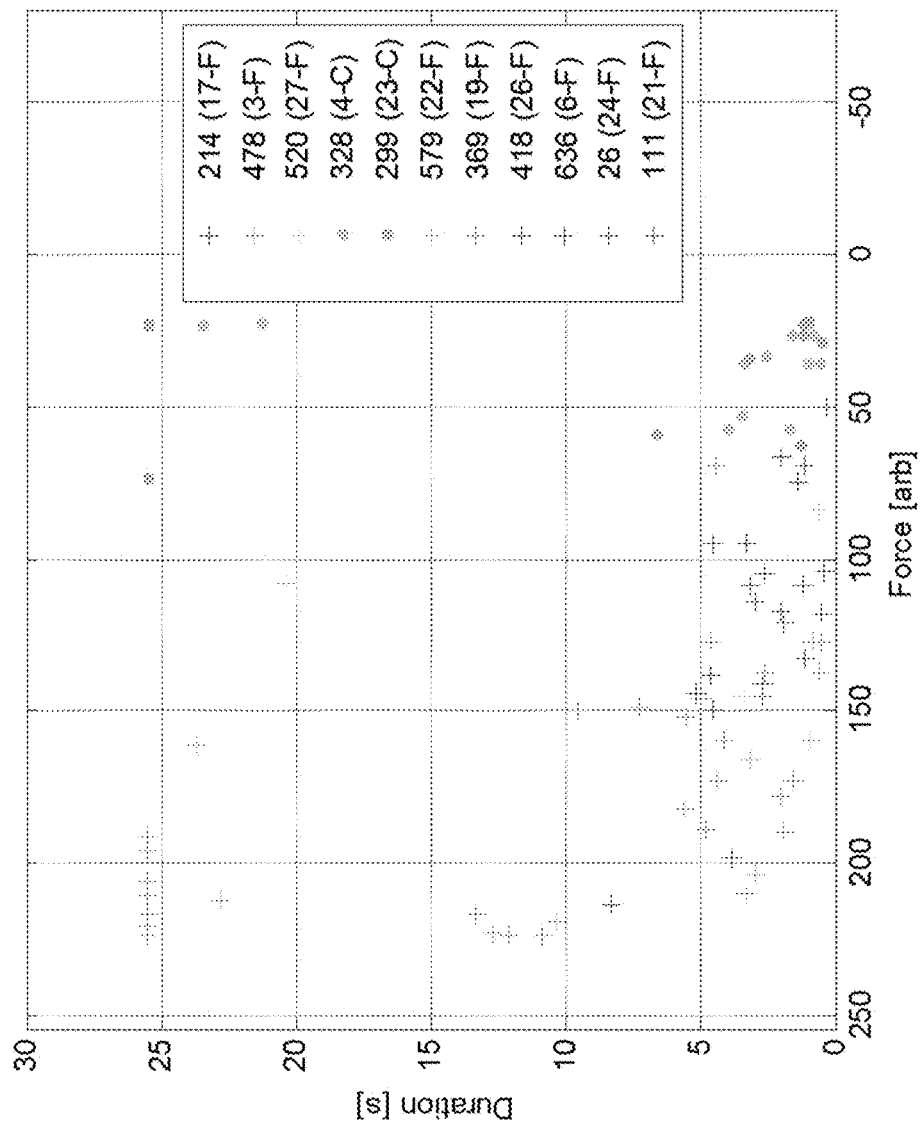
FIG. 18 is a graph showing force and duration data for experimental results of an exemplary sensor apparatus.
Figure 19:
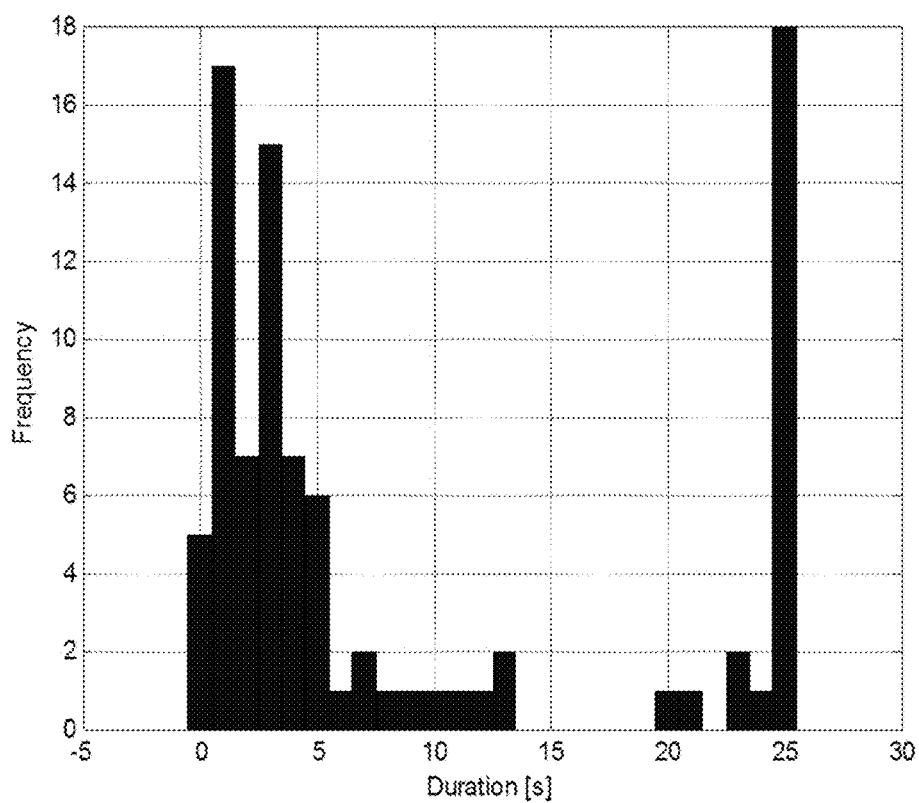
FIG. 19 is a graph showing contact duration for experimental results of an exemplary sensor apparatus.

The duration and force from all the contact sensor measurements is plotted in FIG. 18. Although some of the data may be from people pressing the sensor apparatus before or after it was attached to the animal, a large portion of the data is from animal interaction. In duration, the data exhibits two distinct groups: a bulk of measurements below 8 seconds and a significant cluster at 20 seconds or more. FIG. 19 shows a histogram of all durations and suggests an average duration in the first group at approximately 3 seconds, which is consistent with observations in previous literature (2.6 seconds, 2.3 seconds; standard error around 0.05 seconds). (See, e.g., Xu, Z. Z. et al., *Estrus detection using radiotelemetry of visual observation and tail painting for dairy cows on pasture*, Journal of Dairy Science, 81, pp. 2890-2896 (1998)).

Of the 11 sensor apparatuses placed on animals, motion and contact sensor data from 3-4 provided data consistent with an expected increase in activity, mounting behavior and the timing of insemination. A further three animals, which were not inseminated, did not show clear signs of *oestrus* in the sensor data. The remaining animals were inseminated. However, the data either did not show the expected behavior from *oestrus*, the sensor malfunctioned and may not have been operating to detect the expected indicators from the animal, or both. The increase in motion, where it increased significantly, appears consistent with that expected from previous literature. However, fewer contact events were detected than have been reported for the HeatWatch® system. (See, e.g., Xu, Z. Z. et al., *Estrus detection using radiotelemetry of visual observation and tail painting for dairy cows on pasture*, Journal of Dairy Science, 81, pp. 2890-2896 (1998)).

Thus, the exemplary sensor apparatuses discussed herein allow for accurate and secure placement of the sensor assembly on an animal. The sensor apparatuses further includes a combination of a force sensor and an accelerometer to provide a more accurate detection of a physiological state of the animal. The sensor apparatuses therefore improve animal husbandry practices to provide more accurate monitoring of an animal state, the reproductive state, or both, tiling and to enable better informed, managed and timed actions related to reproductive and other herd management decisions.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A sensor apparatus for attachment to an animal comprising:
    a housing attachable to the animal, the housing having an internal cavity formed therein; and
    a sensor assembly disposed within the internal cavity, the sensor assembly including a capacitance sensor arranged to detect proximity to or contact with another animal and a motion sensor arranged to detect motion of the animal, said proximity to or contact with another animal in combination with the detected motion of the animal being representative of a physiological state of the animal.

2. The sensor apparatus according to claim 1, wherein the sensor assembly comprises a power source, the power source including at least one of a photovoltaic element, a chemical battery, a super capacitor, a fuel cell, or a mechanical energy harvest system.

3. The sensor apparatus according to claim 1, further comprising a processor.

4. The sensor apparatus according to claim 3, wherein the sensor assembly comprises at least one of a visual indicator, an audio indicator, or a radio indicator operatively connected to the processor for generating a signal representative of the physiological state of the animal.

5. The sensor apparatus according to claim 4, wherein the sensor assembly comprises a visual indicator, and wherein the visual indicator comprises an LED.

6. The sensor apparatus according to claim 1, wherein the sensor assembly comprises a transmitter for transmitting sensor data to an electronic device configured to store the data.

7. The sensor apparatus according to claim 1, wherein the physiological state of the animal comprises estrus or standing heat.

8. The sensor apparatus according to claim 1, further comprising a force sensor arranged to measure a magnitude of a force applied to the animal and a length of time the force is applied to the animal.

9. The sensor apparatus according to claim 1, wherein the sensor assembly comprises a transmitter for transmitting the sensor data to an electronic device configured to store the data.

10. The sensor apparatus according to claim 1, wherein the motion sensor comprises an accelerometer that detects a length of time of the motion.

11. A method for detecting a physiological state of an animal comprising:
    detecting with a sensor apparatus having a capacitance sensor mounted to the animal proximity to or contact with another animal with the sensor apparatus;
    detecting with the sensor apparatus having a motion sensor mounted to the animal motion of the animal, proximity to or contact with another animal and motion of the animal being representative of a physiological state of the animal;
    determining the physiological state of the animal based on the detected proximity or contact with another animal and motion of the animal; and
    generating a visual, audio, or radio indication of the physiological state of the animal.

12. The method of claim 11, further comprising the step of measuring a magnitude of a force applied to the animal and a length of time the force is applied to the animal.

13. The method of claim 11, wherein the detected proximity or contact in combination with the detected motion are representative of estrus or standing heat of the animal.

14. The method of claim 11, wherein the motion sensor comprises an accelerometer that detects a length of time of the detected motion.

15. A method for detecting a physiological state of an animal comprising:
    detecting with a sensor apparatus having a capacitance sensor mounted to the animal proximity to or contact with another animal with the sensor apparatus;
    detecting with the sensor apparatus having a motion sensor mounted to the animal motion of the animal, proximity to or contact with another animal and motion of the animal being representative of a physiological state of the animal;
    transmitting sensor data;
    receiving the sensor data;
    analyzing the sensor data; and
    determining the physiological state of the animal.

16. The method of claim 15, further comprising the step of measuring a magnitude of a force applied to the animal and a length of time the force is applied to the animal.

17. The method of claim 15, wherein the detected proximity or contact in combination with the detected motion are representative of estrus or standing heat of the animal.

18. The method of claim 15, wherein the motion sensor comprises an accelerometer that detects a length of time of the detected motion.

* * * * *